United States Patent
Shwaiheen

(10) Patent No.: US 8,220,174 B1
(45) Date of Patent: Jul. 17, 2012

(54) ADJUSTABLE TEMPLATE JIG AND RELATED METHODS

(75) Inventor: Hassan A. Shwaiheen, Tanjib (SA)

(73) Assignee: Saudi Arabian Oil Company (SA)

( * ) Notice: Subject to any disclaimer, the term of this patent is extended or adjusted under 35 U.S.C. 154(b) by 0 days.

(21) Appl. No.: 12/987,674

(22) Filed: Jan. 10, 2011

(51) Int. Cl.
*G01B 1/00* (2006.01)

(52) U.S. Cl. .......................................................... 33/529

(58) Field of Classification Search ............... 33/1 G, 33/529, 613, 645, 21.3
See application file for complete search history.

(56) References Cited

U.S. PATENT DOCUMENTS

| | | | |
|---|---|---|---|
| 1,520,143 A | 12/1924 | Sandell | |
| 1,778,981 A * | 10/1930 | McLaughlin | 33/529 |
| 2,431,100 A | 11/1947 | Woods | |
| 2,502,660 A * | 4/1950 | McLean | 33/529 |
| 2,832,152 A | 4/1958 | Blackshaw | |
| 3,060,587 A * | 10/1962 | Picken | 33/529 |
| 3,270,426 A | 9/1966 | Fischer | |
| 4,793,066 A * | 12/1988 | Cheng | 33/529 |
| 6,732,445 B1 | 5/2004 | Scoville | |
| 2011/0219633 A1* | 9/2011 | Hanna | 33/529 |

FOREIGN PATENT DOCUMENTS

| | | |
|---|---|---|
| GB | 1561764 A | 3/1980 |
| GB | 2181244 A | 4/1987 |
| JP | 352048349 A | 4/1977 |
| JP | 354036963 A | 3/1979 |
| JP | 355135702 A | 10/1980 |
| WO | WO03081169 A1 | 10/2003 |

OTHER PUBLICATIONS

International Search Report and Written Opinion for Related PCT Application PCT/US2012/020756, dated Apr. 12, 2012.

* cited by examiner

*Primary Examiner* — G. Bradley Bennett
(74) *Attorney, Agent, or Firm* — Bracewell & Giuliani LLP

(57) ABSTRACT

Apparatus and methods to model the dimension and contour of a segment of piping to be installed between a pair of open ends of a piping circuit, are provided. A first backing plate of a first end of an exemplary apparatus is connected to a first flange of a piping circuit. A telescopic elongate linkage member is extended and a second backing plate of a second end of the apparatus is connected to a second flange of the piping circuit. Various measurements are taken, to include a rotational angular difference between the backing plate and a coaxial alignment disk coaxially located with the backing plate, an angular difference between a central axis of the backing plate and the main axis of a hinged yoke connected to the coaxial alignment disk, an angular difference between the main axis of the yoke and a longitudinal axis of the linkage member, and an amount of telescopic extension of the linkage member.

26 Claims, 13 Drawing Sheets

ADJUSTABLE TEMPLATE JIG AND RELATED METHODS

BACKGROUND OF THE INVENTION

1. Field of the Invention

This invention generally relates to offshore pipeline repair, particularly to adjustable templates for determining a relative position between two randomly oriented pipe ends, and more specifically, to adjustable template apparatus and methods for modeling the dimension and contour of a segment of piping to be installed between two randomly oriented pipe ends.

2. Description of the Related Art

Oil, gas, and other hydrocarbons from a producing well are typically transported through a subsea pipeline extending along the ocean floor of a reservoir. Such subsea pipeline is often exposed to extreme environmental conditions which can result in damage to a section of the pipeline. Repairs made to subsea pipeline typically include cutting and removing damaged pipe sections, generally performed by divers. Prior to surfacing, the divers typically take measurements in order to estimate the relative position between the two open pipe sections which may or may not match measurements of the removed damage pipe section. A replacement segment of piping is then fabricated for placement between the two open pipe sections.

In the distant past, the trial-and-error approach was the method of choice employed in order to form a replacement segment of pipe that adequately fit between the two open pipe sections. This was found to be extremely costly and the prepared segment was found to be prone to leaks. Later, various other methodologies were employed to try to more accurately measure the distance and relative orientation between the two open pipe sections. One methodology that has been employed in the past includes utilization of a measurement device employing a telescopic extension bar between the two mating flanges, which is adjusted and then tightened using a single wing nut and/or adjusted through use of a hand-tight clamp. Recognized by the inventor, however, is that, although relatively simple in design, the length of the telescopic extension bar cannot be precisely secured, and thus, can result in substantial inaccuracies. Inaccurate measurements are very costly in the offshore environment as section replacement can involve a very large barge and a significant amount of diving related assets and time. Inaccurate measurements can result in a requirement to modify the replacement section, which can be time-consuming and extremely expensive in diver time, barge time, and lost production. Accordingly, recognized by the inventor is the need for a measurement device that has very efficient securing mechanisms to avoid slippage of the connecting parts for measuring the linear distance between pipe ends.

There are also other limitations to the conventional designs. For example, the above described conventional design causes an inherent limitation in the length of separation between the two open pipe sections that can be measured, which can be problematic. Specifically, as the design is relatively old, the design does not appear to include any provisions needed to account for the large size flowlines, which have become more common in recent years. Even when used in smaller flowlines, no accommodations are made where the spacing exceeds the maximum telescopic extension capability. Accordingly, recognized by the inventor is the need for a measurement device that includes provisions for adding-on sections to extend a telescopic length bar for measuring the linear distance between pipe ends for lengthy subsea spools encountered during subsea pipeline repair.

Conventional designs of a measurement device are known to use swivel flanges which rotate about a pivot ball to match the flange faces orientation. Recognized by the inventor, however, is that such swivel flanges are not only costly, the "pivot ball" is difficult to lock. Therefore, it very difficult to guarantee the measured position of miter degree and rolling offset when using such device. Also, such conventional measurement device does not include provisions for marking the flange twist angles for reference. As such, any even slight accidental movement of the pivot ball, once the template is lifted from seabed for fabrication, causes major discrepancies which require expensive re-fabrication.

Recognized, therefore, is the need for a measurement device that is suitable for use during construction of any size flow line as well as for the repair of subsea trunk lines where very long pipe spools are required to be fabricated, and that is simpler than conventional measuring devices, that contains less moving parts, and that can be used by non-skilled divers.

Also recognized is the need for a measuring device that uses vertical and horizontal positioning plates with robust securing mechanisms such as, for example, two spanner locknuts, and that includes position marking planes that guarantee rigidity of the template and marking reference. Further, recognized is the need for a measuring device that employs a backing plate with bolt holes that can be rotated to match the rotation of the existing flange hole centers, which can allow for the use of standard weld neck flanges that are more cheaper and readily available in the market. Recognized by the inventor is that such design can advantageously produce very precise results from the first attempt due to better securing mechanisms, and can allow pipeline fabricators to easily recognize changes in the template initial position due to lifting, as the fabricators can readily identify, for example, any loose locknuts or changed marks.

SUMMARY OF THE INVENTION

In view of the foregoing various embodiments of the present invention advantageously provide a measurement apparatus that has very efficient securing mechanisms to avoid slippage of the connecting parts for the linear distance. Various embodiments of the present invention advantageously provide a measurement apparatus that is suitable for use during construction of any size flow line as well as for the repair of subsea trunk lines where very long pipe spools are required to be fabricated, and that is simpler than conventional measuring devices, that contain less moving parts, and that can be used by non-skilled divers. Various embodiments of the present invention advantageously provide a measurement apparatus that includes provisions for adding-on sections to extend a telescopic length bar for lengthy subsea spools encountered during subsea pipeline repair.

Various embodiments of the present invention advantageously provide a measuring apparatus that uses vertical and horizontal positioning plates with robust securing mechanisms such as, for example, two spanner locknuts, and that include position marking planes that guarantee rigidity of the template and marking reference. Various embodiments of the present invention advantageously provide a measuring apparatus that employs a backing plate with bolt hole centers that can be rotated to match the rotation of the existing flange hole centers, which can allow for the use of standard weld neck flanges that are cheaper and readily available in the market. Advantageously, such design can produce very precise results from the first attempt due to better securing mechanisms, and can allow pipeline fabricators to easily recognize changes in the template initial position due to lifting, as the fabricators can readily identify, for example, any loose locknuts or changed marks.

Specifically, an example of an embodiment of a measuring apparatus (e.g., adjustable template apparatus) includes a first end portion configured to connect to a first flange of a first open end of a piping circuit, and a second end portion configured to connect to a second flange of a second open end of the piping circuit to thereby resolve the following criteria (1) measurement of the linear center to center distance between the existing subsea pipeline flange faces; (2) measurement of the rolling offset of subsea pipeline flanges centerline with respect to each other in X and Y planes (horizontal and vertical); (3) measurement of the degree of flange bolt holes orientation to avoid installation of expensive swivel flanges; and (4) measurement of the pipe to flange miter degree. To this end, one or both of the first and the second end portions of the apparatus can include a backing plate, a coaxial alignment disk (positioning plate) configured to land upon the face of the backing plate and to rotate in relation to the backing plate, a bolt or other member extending through a bolt hole in the center of the backing plate and the center of the coaxial alignment disk, a scale positioned on a face of the coaxial alignment disk, and a radially offset alignment member positioned to indicate a relative rotation of the coaxial alignment disk in relation to the backing plate to thereby define at least a portion of an angular rotation between the first and the second flanges of the piping circuit.

According to an exemplary configuration, the backing plate includes a plurality of circumferentially spaced apart bolt holes extending through the backing plate and positioned to align with a corresponding plurality of circumferentially spaced apart bolt holes extending through the flange of the piping circuit to connect to the backing plate over an open face of the flange. The backing plate also includes a centrally positioned bolt hole positioned at a center of the backing plate and extending therethrough, and optionally can include a bolt hole positioned offset from the center to carry the alignment member.

The coaxial alignment disk also includes a centrally positioned bolt hole and a bolt or other member extending therethrough to rotationally connect the coaxial alignment disk to the backing plate. A spanner locknut, for example, connecting to the centrally located bolt can be used to immobilize or release the rotational connection between the backing plate and the alignment disk. A radially offset alignment aperture typically in the form of an annular slot or groove extending through the coaxial alignment disk receives the radially offset alignment member to indicate a relative rotation of the coaxial alignment disk atop the backing plate. The scale positioned on the face of the coaxial alignment member adjacent the alignment aperture further helps the user identify incremental degrees of relative rotation between the backing plate and the coaxial alignment disk.

The first and the second ends of the adjustable template apparatus connect to each other via an adjustable telescopic linkage assembly connected on opposite ends to a pair of hinged yokes each connected to a corresponding pair of radially spaced apart hinges connected to the face of the respective coaxial alignment disk. Advantageously, the hinged yoke is rotationally connected to the pair of radially spaced apart hinges to thereby account for a portion of a vertical differential between the first and the second flanges of the piping circuit and/or an at least primarily vertical component of pipe-to-flange miter for the respective adjacent flange of the piping circuit.

According to the exemplary configuration, each end of the linkage assembly includes an arm connected to the apex portion of the respective hinged yoke. Each arm can include a coaxial alignment flange (positioning plate) having a bolt hole coaxially located with the bolt hole in the apex of the respective hinged yoke and a radially offset alignment aperture typically in the form of an annular slot or groove extending therethrough positioned to receive a corresponding radially offset bolt or alignment member to indicate a relative rotation between the apex of the yoke and the arm. A scale positioned on the face of the coaxial alignment flange adjacent the alignment aperture further helps the user identify incremental degrees of relative rotation therebetween.

According to the exemplary configuration, the adjustable telescopic linkage assembly includes a telescoping member adapted to be positioned between an extended position and a retracted position, and a plurality of fixed-size replaceable sections positioned to extend a telescopic length of the linkage assembly to a distance short of the distance between the first and the second flanges of the piping circuit. Advantageously, the fixed-size replace sections can be combined so that a shortfall in the combined length prior to adjustment of the telescopic member places the length of the linkage assembly within the range of telescopic positioning values provided by the telescoping member.

Further, according to the exemplary configuration, the telescopic member can include a first lateral extension member fixedly connected to a stationary member, a second lateral extension member fixedly connected to a retractable member and extending through the elongate aperture in the stationary member, a threaded positioning member extending between the first lateral extension member and the second lateral extension member, and a pair of extension member positioning nuts threadingly connected to the threaded positioning member. Advantageously, the outer-most extension member positioning nut is positioned so that when tightened until engagement with a first portion of the second lateral extension member facing the adjacent end portion of the apparatus, the extension member positioning nut identifies an amount of extension needed to connect the second end portion of the apparatus to the second flange with the first end portion of the apparatus connected to the first flange of the piping circuit, and vice versa. The inner-most extension member positioning nut can be employed to complement the first extension member positioning nut to immobilize movement of the second lateral extension member, and thus, movement of the retractable member. Further advantageously, a second portion of the second lateral extension member located opposite the first portion of the second lateral extension member can be left or made unobstructed by loosening the inner most extension member positioning nut to allow collapsing of the retractable member within the stationary member when disconnecting the first backing plate from the first flange of the piping circuit and/or when disconnecting the second backing plate from the second flange of the piping circuit.

Various embodiments of the present invention also include methods for modeling the dimension and contour of a segment of piping to be installed between a pair of open ends of a piping circuit having a corresponding pair of connection flanges. According to an example of an embodiment of such a method, the method can include the steps of connecting a first backing plate of an adjustable template apparatus over an open face of a first flange of a piping circuit of a pair of flanges, and connecting a second backing plate of the adjustable template apparatus over an open face of a second flange of the piping circuit. The connecting steps for each backing plate can include rotating the backing plate to align to include bolt holes extending through the backing plate with bolt holes extending through the respective flange, and extending a retractable telescopic linkage member of a linkage assembly connecting the first and the second end of the apparatus.

The method can also include immobilizing rotation between the first backing plate and a first coaxial alignment disk coaxially located with and landing upon a face of the first backing plate and configured to rotate in relation thereto along a first common central axis. The method can also include utilizing a radially offset alignment member extending into or through an angular shaped aperture in the first coaxial alignment disk and/or a scale positioned on the face of the first coaxial alignment disk to mark and identify the rotational angular difference between the first backing plate and the first coaxial alignment disk to thereby define at least a portion of an angular rotation between the pair of flanges of the piping circuit. Depending upon the configuration of the adjustable template apparatus, the immobilizing and identifying steps are also performed with respect to the second backing plate and a second coaxial alignment disk configured similarly to the first coaxial alignment disk.

The method can also include the steps of immobilizing the rotational position of a first hinged yoke connected to the first coaxial alignment disk by a pair of radially spaced apart hinges to mark and identify an angular difference between the central axis of the backing plate and the main axis of a first hinged yoke to thereby define at least a portion of a vertical differential between the first flange of the piping circuit and the second flange of the pair of flanges of the piping circuit. Depending upon the configuration of the adjustable template apparatus, the immobilizing and identifying steps are also performed with respect to the second coaxial alignment disk and a second hinged yoke connected to the second coaxial alignment disk.

The method can also include immobilizing rotation between an apex of the first hinged yoke and a coaxial alignment flange coaxially located with and landing upon a face of the apex of the first hinged yoke and configured to rotate in relation thereto along a common axis. The method can also include utilizing a radially offset alignment member extending into or through an angular shaped aperture in the first coaxial alignment flange and/or a scale positioned on the face of the first coaxial alignment flange to mark and identify the rotational angular difference between the main axis of the first hinged yoke and a longitudinal axis of the linkage assembly to thereby define at least a portion of a lateral differential between the first flange of the piping circuit and the second flange of the piping circuit. Depending upon the configuration of the adjustable template apparatus, the immobilizing and identifying steps are also performed with respect to the second hinged yoke and a second coaxial alignment flange configured similarly to the first coaxial alignment flange.

The method can further include marking or otherwise identifying an amount of extension of the telescopic linkage member needed to connect both the first and the second sections of the adjustable template apparatus. This step can include tightening an extension member positioning nut threadingly connected to a threaded positioning member extending between a first stationery lateral extension member fixedly connected to a stationary member of the telescopic linkage member and a second lateral extension member fixedly connected to a retractable member of the telescopic linkage member. The extension member positioning nut is tightened, for example, until engagement with a first portion of the second lateral extension member facing the adjacent end portion of the apparatus to thereby identify an amount of extension needed to connect the second backing plate to the second flange when the first backing plate is connected to the first flange, and vice versa. According to the exemplary embodiment of the method, a second portion of the second lateral extension member located opposite the first portion, however, is left unobstructed to allow at least partial collapsing of the retractable member within the stationary member when disconnecting the first backing plate from the first flange of the piping circuit and/or when disconnecting the second backing plate from the second flange of the piping circuit.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

DETAILED DESCRIPTION

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime notation, if used, indicates similar elements in alternative embodiments or like elements.

Figure 1:
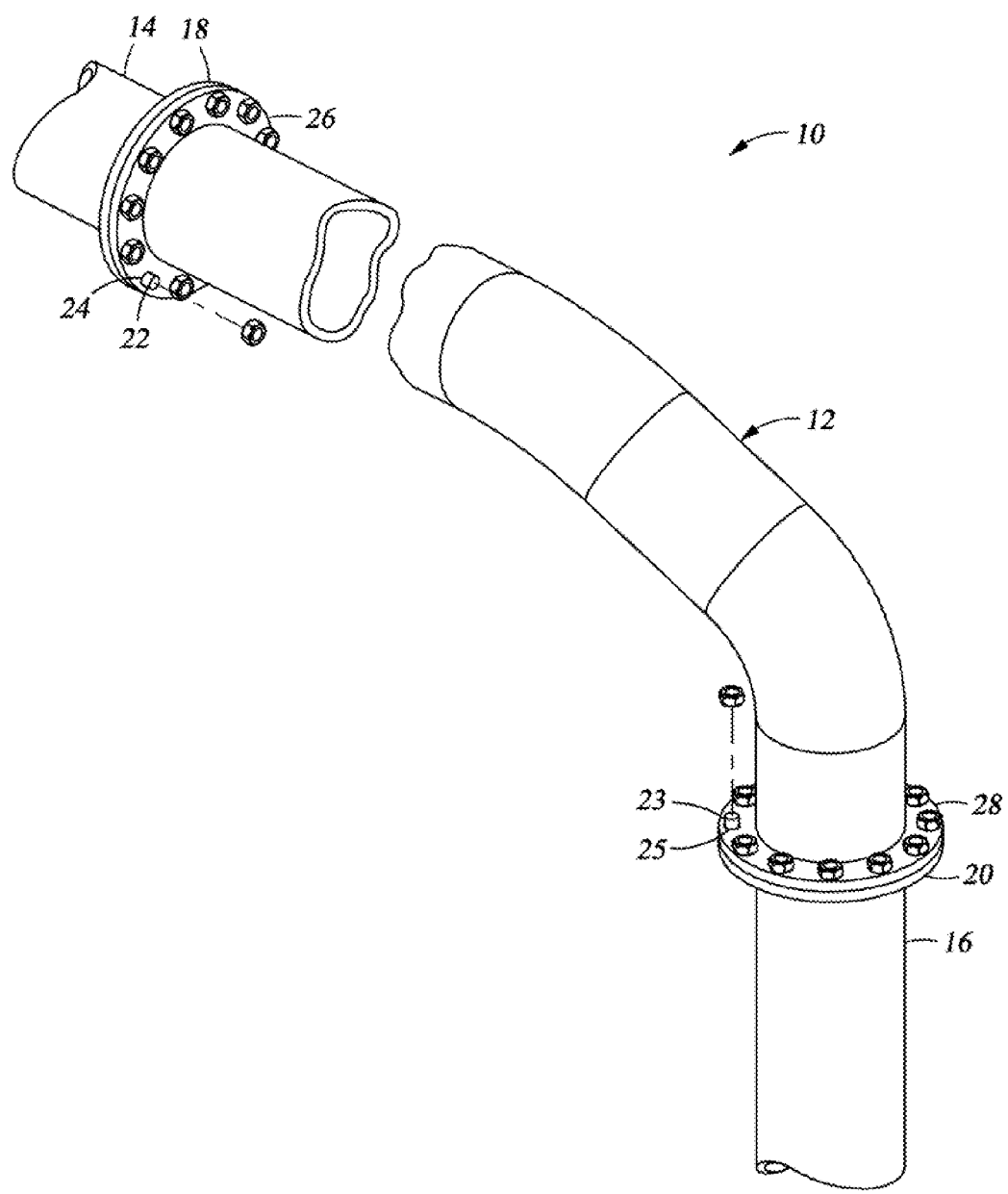
FIG. 1 is a perspective view of a damaged segment of piping installed between a pair of open ends of a piping circuit.

FIG. 1 illustrates a piping circuit 10 having a leaking, corroded or otherwise damaged or defective section 12 connected between a pair of open ends 14, 16 of the piping circuit 10. In a first scenario, the defective or damaged section 12 can be removed at a connection with flanges 18, 20 of the respective open ends 14, 16 through removal of a set of bolts 22, 23 extending through coaxially located bolt holes 24, 25 connecting flanges 18, 20 to corresponding flanges 26, 28. Alternatively, for particularly for very long sections 12, the defective portion of the defective section 12 can be cut on either side by divers and stub end fittings (not shown) formed of a short section of pipe having a matching inner and outer diameter as that of the open ends 14, 16, and a corresponding pair of connection flanges 18, 20, can be welded to the remaining portions of the piping circuit 10 to form the open ends 14, 16 having flanges 18, 20, respectively.

Figure 7:
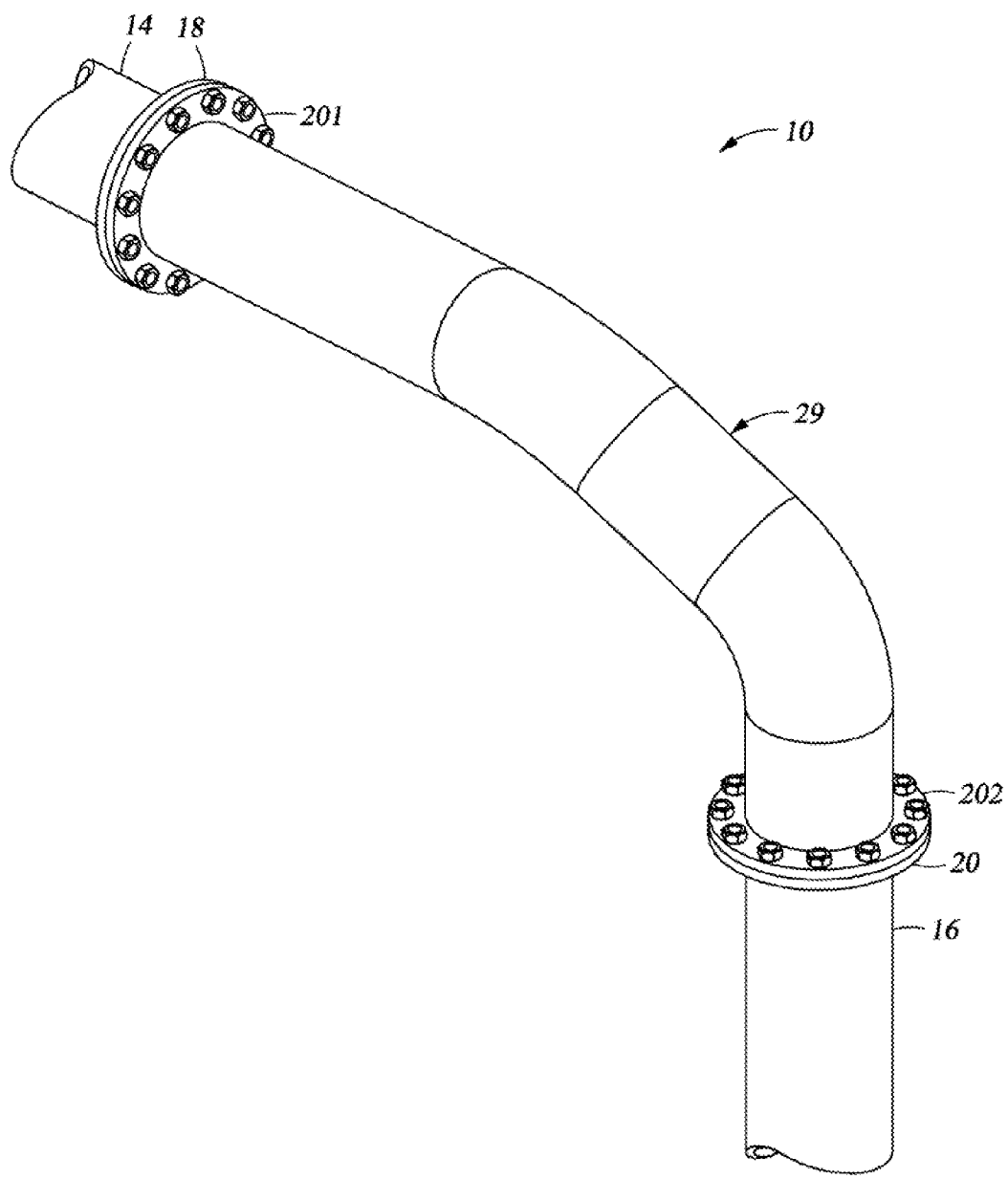
FIG. 7 is a perspective view illustrating operational employment of a replacement segment of piping defined by measurements provided by the adjustable template apparatus shown in FIG. 6 according to an embodiment of the present invention.

Regardless of the methodology of removing the defective or damaged section 12, prior to surfacing, the divers take measurements in order to estimate the relative position and orientation between the two flanges 18, 20, of the open pipe sections 14, 16, which may or may not match measurements of the removed damage pipe section 12, even when the damaged or defective section was merely "unbolted" from flanges 18, 20. These measurements are then utilized to provide data to be used to fabricate a replacement segment of piping 29 (see, e.g., FIG. 7) for placement between and connection to flanges 18, 20 of the open pipe sections 14, 16. According to an embodiment of the present invention, the measurements include, for example, data indicating the linear center to center distance between the faces of the pipeline flanges 18, 20; the rolling offset of the centerline of flanges 18, 20 with respect to each other in the horizontal (X-axis) and vertical (Y-axis) planes; the degree of orientation (e.g., rotation) of the flange bolt holes 24, 25; and the degree of pipe-to-flange miter, e.g., to negate the need for expensive swivel flanges and/or flanges having radially oriented bolt receiving slots or grooves.

Figure 2:
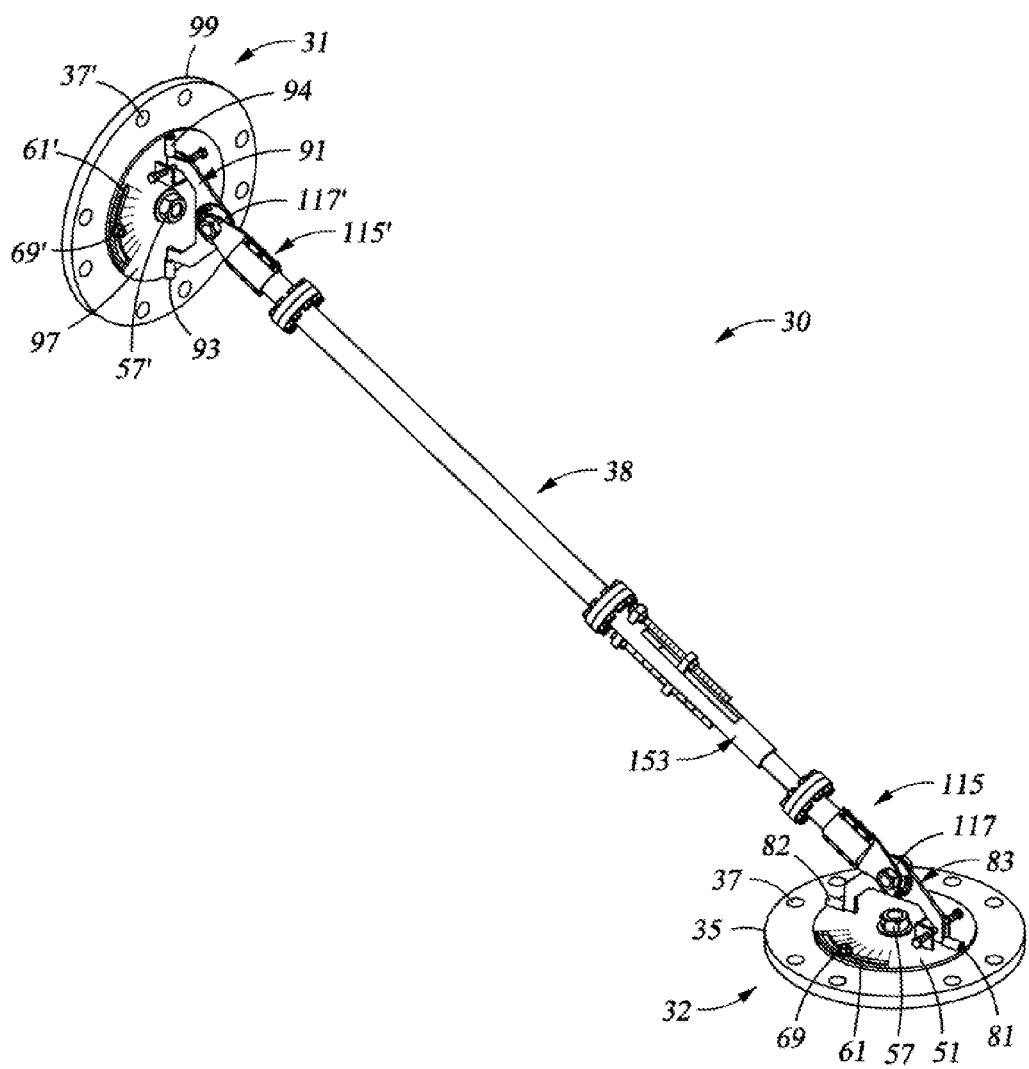
FIG. 2 is a perspective view of an adjustable template apparatus to model the dimension and contour of a segment of piping to replace the damaged segment of piping shown in FIG. 1 according to an embodiment of the present invention.

FIG. 2 illustrates an example an adjustable template apparatus 30 according to an embodiment of the present invention to model the dimension and contour of the segment 29 to be manufactured to replace the damaged segment 12 of piping 10, that is simple to use and that provides precise measurements on the first attempt, negating any need for additional costly subsea measurements to be performed.

Apparatus 30 includes, for example, a first end portion 31 configured to connect to flange 18, a second end portion 32 configured to connect to flange 20, and a linkage assembly 38 extending between the first end portion 31 and the second end portion 32. According to the illustrated configuration, the first and second end portions 31, 32, can, but need not, each include similar components.

As perhaps best shown in FIGS. 2 and 3A-3C, the second end portion 32 includes, for example, a backing plate 35 having circumferentially spaced apart bolt holes 37 positioned to align with the corresponding circumferentially spaced apart bolt holes 25 extending through flange 20 to connect to the backing plate 35 over an open face of the flange 20. The backing plate 35 also includes a centrally positioned bolt hole 39 extending through the center of the backing plate 35. The second end portion 32 also includes a coaxial alignment disk (positioning plate) 51 configured to land upon a face of the backing plate 35 and to rotate in relation to the backing plate 35 to indicate at least a portion of a rotational difference between the annular positioning of the bolt holes 25 of flange 20 in relation to a reference axis and/or the annular positioning of bolt holes 24 of flange 18.

Figure 3A:
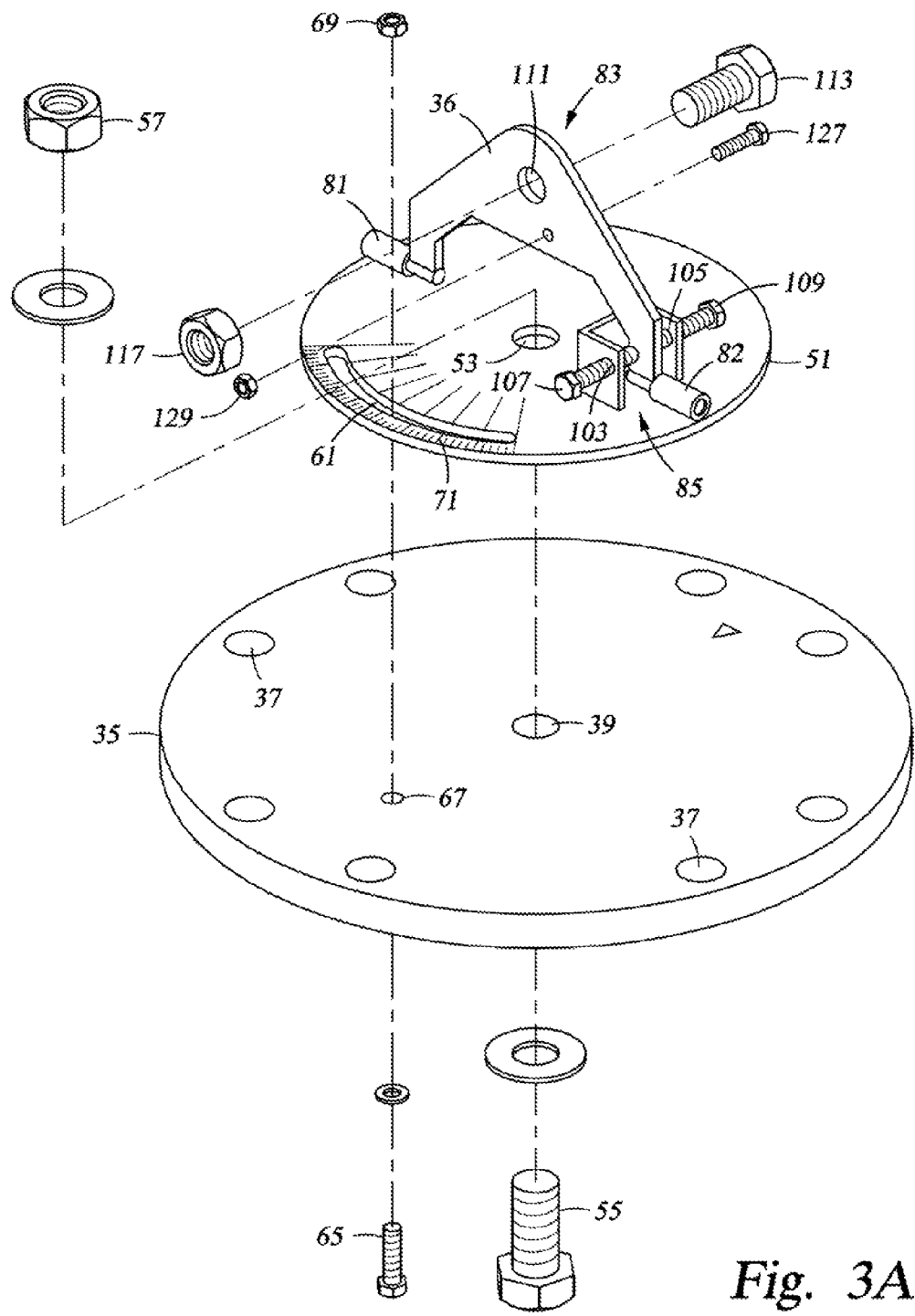
FIG. 3A is an exploded perspective view of a portion of the adjustable template apparatus as shown in FIG. 2 according to an embodiment of the present invention.
Figure 5:
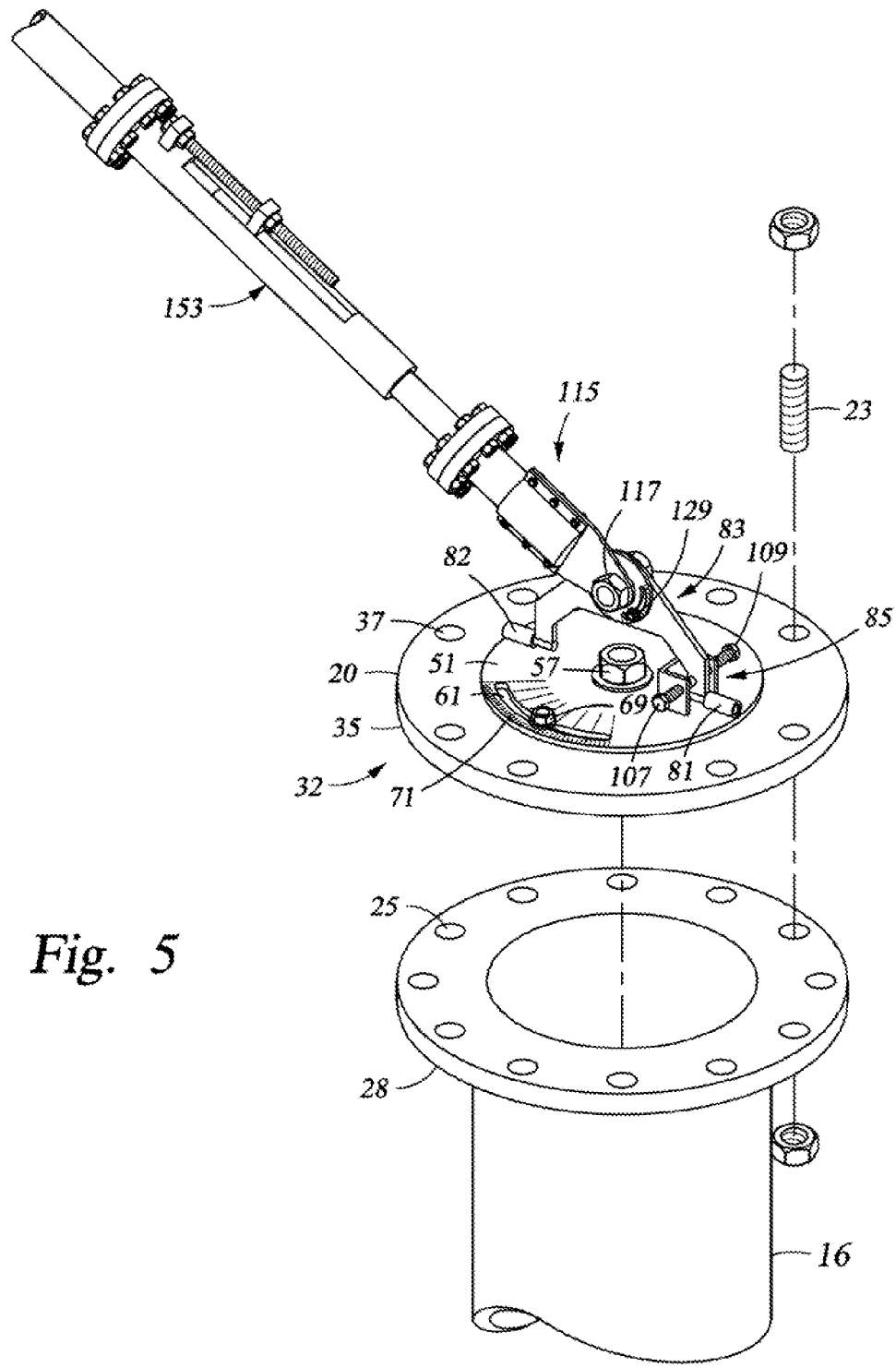
FIG. 5 is a perspective view of an end of the apparatus shown in FIG. 2 being connected to an end of the piping circuit shown in FIG. 1 according to an embodiment of the present invention.

As perhaps best shown in FIGS. 3A and 5, according to the illustrated configuration, the coaxial alignment disk 51 includes a centrally positioned bolt hole 53 positioned at a center of the disk 51, which is coaxially located with the centrally positioned bolt hole 39 extending through backing plate 35, to receive a bolt 55. A corresponding nut 57, typically in the form of a spanner locknut, can be used to immobilize movement between the backing plate 35 and the alignment disk 51. Further, alignment disk 51 can include a radially offset alignment aperture or slot 61 positioned to receive a radially offset alignment member. According to the illustrated configuration, the alignment member includes a bolt 65 that extends through an a radially offset aperture 67 extending through the backing plate 35 and the alignment aperture 61 extending through the alignment disk 51 to help mark an amount of rotation between the backing plate 35 and the alignment disk 51. The alignment member also include a nut 69, typically in the form of a spanner locknut, connected to bolt 65, which can be utilized as both a marker and a fastening means to further immobilize relative rotational movement between backing plate 35 and alignment disk 51.

Note, according to an alternative embodiment of the present invention, rather than an aperture 67 positioned to receive bolt 65, the backing plate 35 can instead include a protuberance (not shown) extending out from a surface of backing plate 35 and at least partially through alignment aperture 61. According to another alternative embodiment of the present invention, backing plate 35 includes a recess (not shown) extending into a surface of the backing plate 35 to be visible through alignment aperture 61. According to yet another embodiment of the present invention, backing plate 35 includes surface markings (not shown) visible through slot 61. Other variations of an alignment member are, however, within the scope of the present invention.

According to the exemplary configuration, a scale 71 positioned on a face of the coaxial alignment disk 51 provides an enhanced visual indication of the relative rotation of the alignment disk 51 in relation to the radially offset alignment member (e.g., nut 69 connected to bolt 65), and thus, the relative rotation between the alignment disk 51 and the backing plate 35 to thereby further aid users in determining the angular rotation the first and the second flanges 18, 20, with respect to a reference axis and/or with respect to each other. Advantageously, such marking means provides a convenient methodology of documenting the amount of rotation and later verifying that the settings of the apparatus 30 have not changed during transit. Note, scale 71 can be positioned above and/or below aperture/slot 61.

According to an embodiment of the present invention, the second end portion 32 further includes a pair of radially spaced apart hinges 81, 82 connected to the face of the coaxial alignment disk 51, and a hinged yoke 83 rotationally connected to the pair of hinges 81, 82, to account for at least a portion of a vertical differential between end portions 31, 32 representing the vertical differential between flanges 18, 20 and/or the primarily vertical component of miter between flange 20 and the portion of the piping circuit 10 shown at 16. A hinge fixation member 85 connected to the face of the coaxial alignment disk 51 can be utilized to immobilize an angular positioning of the yoke 83 prior to removal and transport of apparatus 30.

Figure 4:
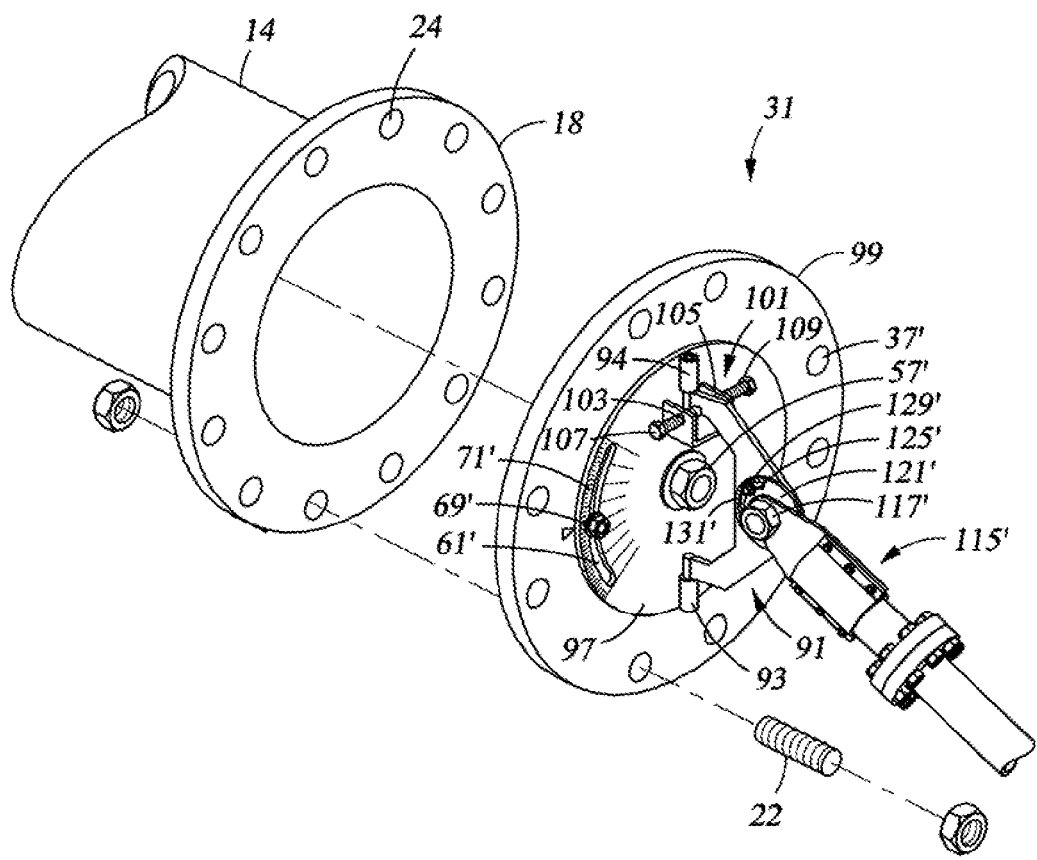
FIG. 4 is a perspective view of an end of the apparatus shown in FIG. 2 being connected to an end of the piping circuit shown in FIG. 1 according to an embodiment of the present invention.

FIG. 4 illustrates a similar hinged yoke 91 connected to hinges 93, 94 connected to the face of a coaxial alignment disk (positioning plate) 97 connected to backing plate 99 and capable of being immobilized by a similar hinge fixation member 101. As perhaps best shown with respect to FIGS. 3A, 4, and 5, the hinge fixation member 85, 101 can include a pair of oppositely positioned coaxially aligned spaced apart bolt holes 103, 105 containing a corresponding pair of alignment bolts 107, 109. Note, similar in function to yoke 83 (FIGS. 3a and 5), yoke 91 (FIG. 4) can account for at least a portion of a vertical differential between end portions 31, 32 representing the vertical differential between flanges 18, 20 with respect to a new reference axis and each other, and/or the primarily vertical component of miter between flange 18 and the portion of the piping circuit 10 shown at 14.

According to the illustrated configuration, each hinge fixation member 85, 101, includes a pair of alignment bolts 107, 109. The first bolt 107 of the pair of alignment bolts 107, 109 is positioned to engage an upper or first surface of a leg of the respective hinged yoke 83, 91, and the second bolt 109 of the pair is positioned to engage a lower or opposite surface of the leg of the respective hinged yoke 83, 91 to thereby immobilize rotation of the hinged yoke 83, 91 about hinges 81, 82, and 93, 94, respectively, during surface transport.

As perhaps best shown in FIG. 3A, yoke 83 includes an apex portion having a bolt hole 111 to receive bolt 113 to connect the yoke 83 to an arm 115 (see, e.g., FIG. 3B) of the linkage assembly 38. A nut 117, typically in the form of a spanner locknut, can be used to immobilize movement between the apex portion of the yoke 83 and arm 115. Note, yoke 91 is typically similarly arranged.

Figure 3B:
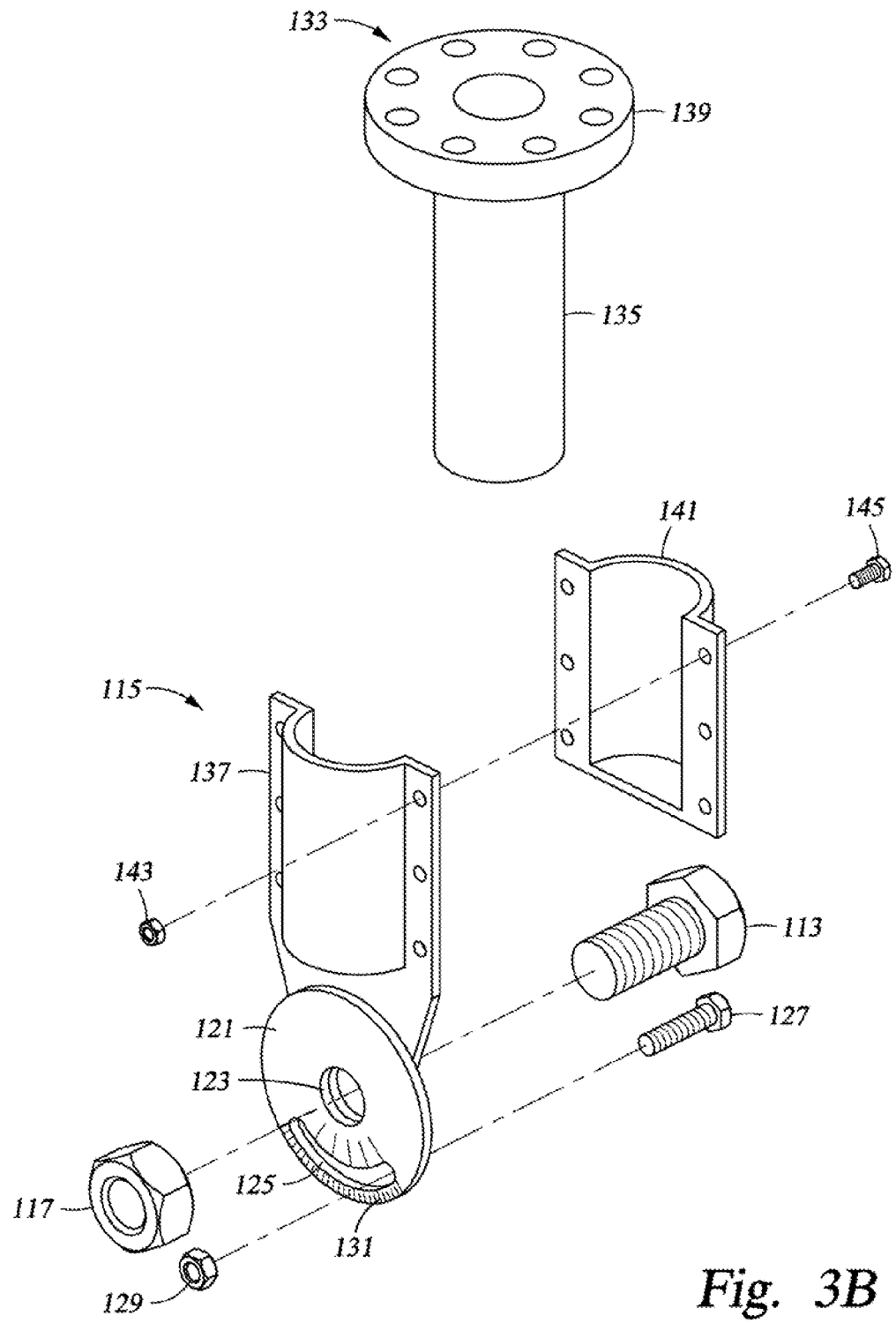
FIG. 3B is an exploded perspective view of a portion of the adjustable template apparatus as shown in FIG. 2 according to an embodiment of the present invention.

As perhaps best shown in FIG. 3B, arm 115 includes a coaxial alignment flange (positioning plate) 121 having a bolt hole 123 coaxially located with the bolt hole 111 extending through the apex of yoke 83 (see, FIG. 3A) to receive bolt 113 and to be immobilized through use of nut 117. Arm 115 can also include a radially offset alignment aperture 125 typically in the form of a radial slot positioned to receive a radially offset alignment member, typically in the form of a bolt 127 and nut 129 in order to enhance immobilizing movement between arm 115 and the apex of yoke 83 and to provide an easily discernible visual reference of the amount of relative rotation therebetween. Arm 115 can also include a scale 131 positioned on a face of the alignment flange 121 to further provide an enhanced visual reference to the relative rotation of the alignment flange 121 in relation to the apex portion of the yoke 83 about a common axis extending through the bolt holes 111, 123 of the yoke 83 and coaxial alignment flange 121, respectively, to thereby account for at least a portion of a horizontal differential between the first and the second flanges 18, 20 and/or an at least primarily horizontal component of pipe-to-flange miter for flange 18. Note, scale 131 can be positioned above and/or below aperture/slot 125.

The arm 115 can also include a stub 133 having a tubular portion 135 to connect to the main body 137 of arm 115 and a flange portion 139 to connect to elongate portions of the linkage assembly 38, described in more detail below. A clamp 141 connected to the main body 137 with a plurality of nuts and bolts 143, 145 engage and clamp down upon the tubular portion 135 of the stub 133. Note, as shown in FIG. 4, the first end portion 31 of the apparatus 30 can include an arm 115' similarly configured to arm 115.

Figure 3C:
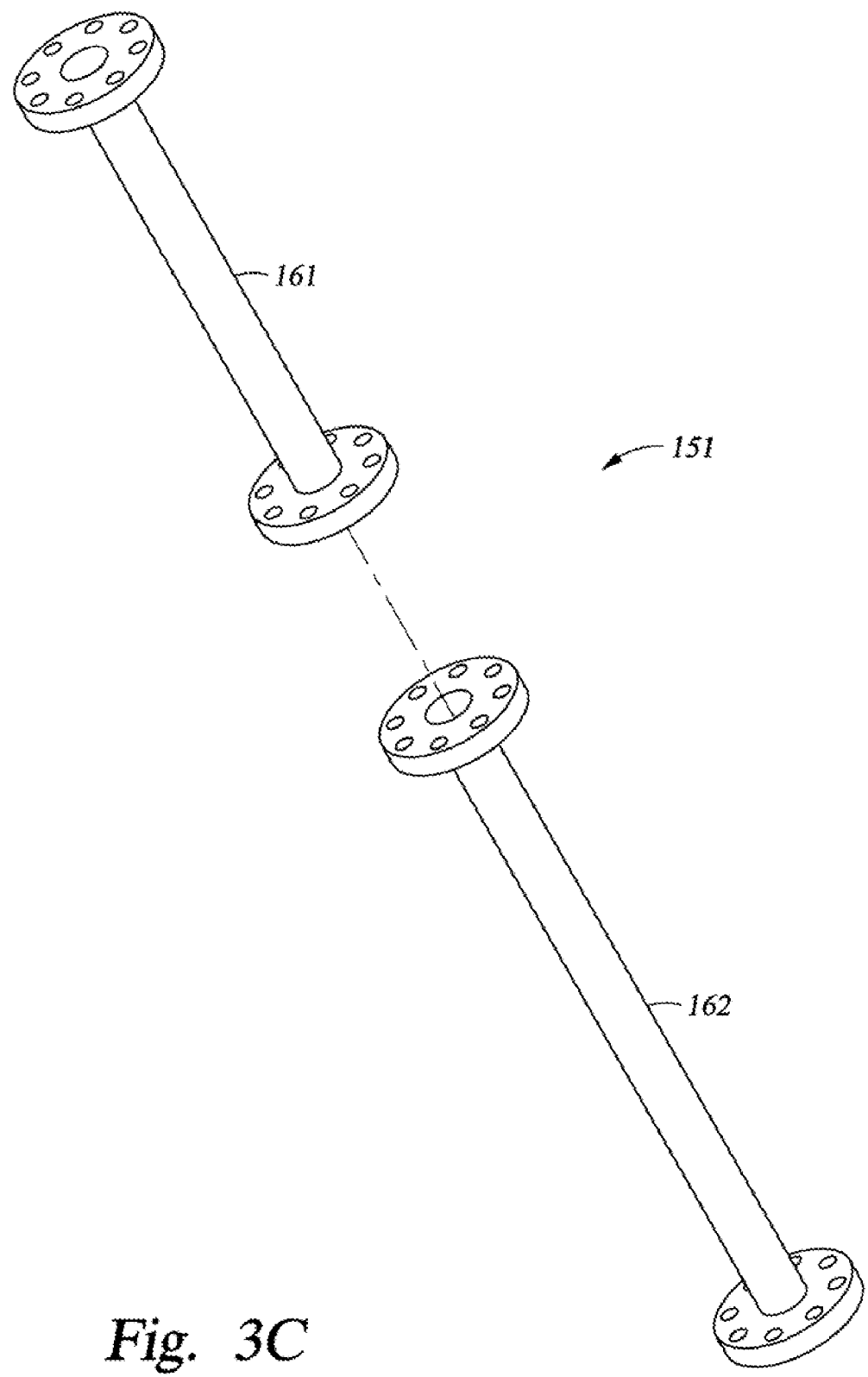
FIG. 3C is an exploded perspective view of a portion of the adjustable template apparatus as shown in FIG. 2 according to an embodiment of the present invention.
Figure 3D:
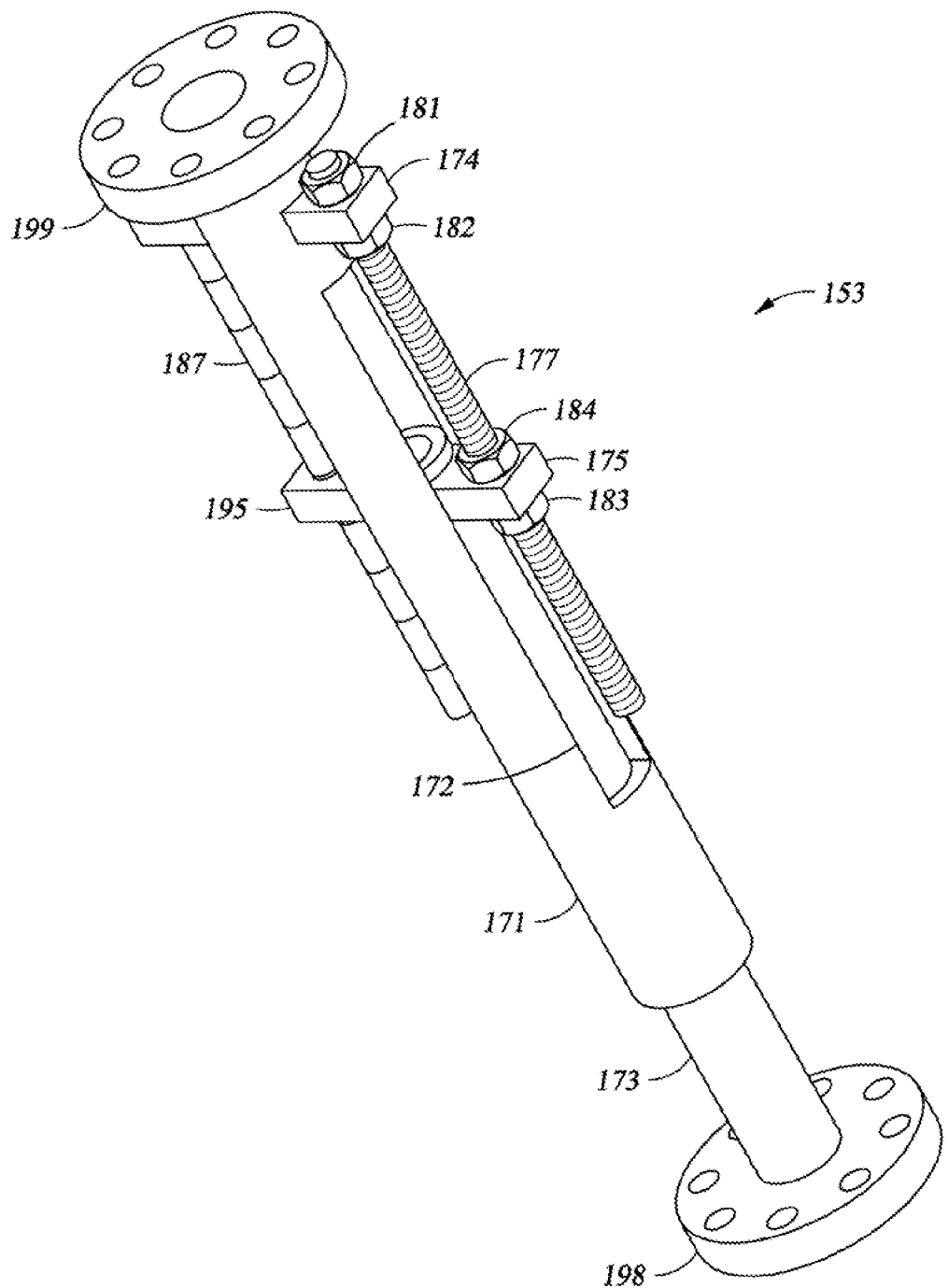
FIG. 3D is a perspective view of a portion of the adjustable template apparatus as shown in FIG. 2 according to an embodiment of the present invention.

As perhaps best shown in FIGS. 3C and 3D, according to the exemplary configuration, the linkage assembly 38 is typically in the form of kit of multiple fixed and adjustable components extending between the apex of yoke 83 and the apex of yoke 91 which together provide both a means for extending between flanges 18, 20, which can have a wide range of separation values, and an indication of at least a portion of a relative distance between flanges 18, 20 of the piping circuit 10. Specifically, the linkages assembly 38 can include a plurality of fixed-size replaceable sections 151 of differing lengths and a telescoping member 153 adapted to be positioned between an extended position and a retracted position. The fixed-size replaceable sections 151 can include those long and short fixed length members 161, 162 which can be assembled in various combinations to extend the telescopic length of the linkage assembly 38 to a distance that typically falls just short of the distance between flanges 18, 20 of the piping circuit 10. One or more of the members 161, 162 are connected to arm 115' (see, e.g., FIGS. 2, 5, and 5) and to each other, if more than one member 161, 162 is required to bring the length of the linkage assembly 38 to within a known range of values of the telescopic member 153. The telescopic member 153, connected to the fixed member or members 161, 162, is then extended or retracted to fine-tune the telescoping of the linkage assembly 38 to precisely connect the first and second ends 31, 32 of the apparatus 30 to the respective flanges 18, 20.

Figure 3E:
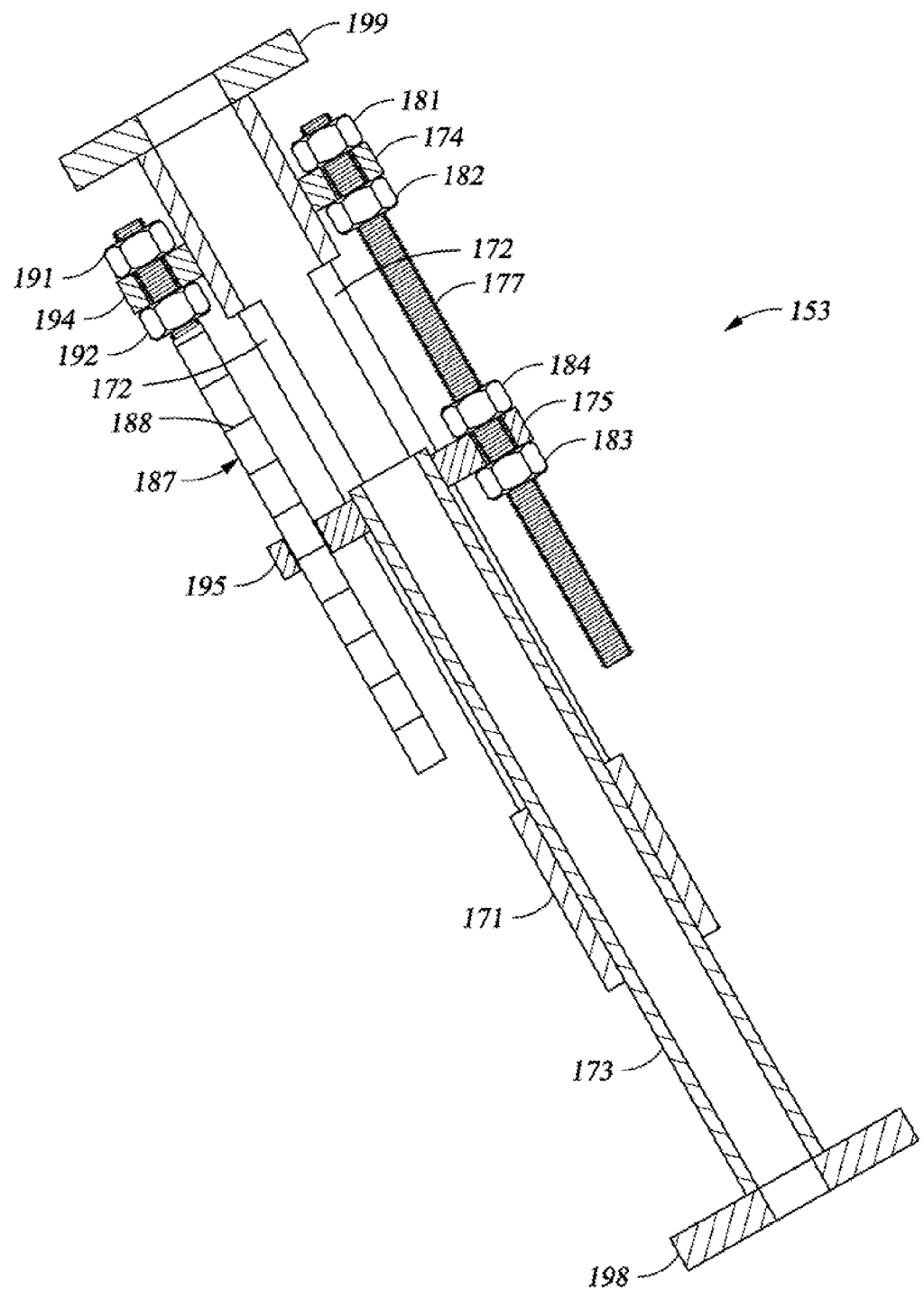
FIG. 3E is a rotated sectional view of the portion of the adjustable template apparatus shown in FIG. 3 according to an embodiment of the present invention.

As shown in FIGS. 3D and 3E, according to the illustrated configuration, telescopic member 153 includes a stationary member 171 having an elongate aperture 172 extending through a side portion of the stationary member 171, and a retractable member 173 positioned to retract within main body portions of the stationary member 171. A lateral extension member 174 is connected to the stationary member 171. Similarly, a lateral extension member 175 is connected to the retractable member 173 which extends through the elongate aperture 172 in the stationary member 171. A threaded positioning member 177 extends between and through extension members 174, 175. A pair of fixture nuts 181, 182, and a pair of extension member positioning nuts 183, 184, are provided to connect the threaded positioning member 177 between the lateral extension members 174, 175. Telescopic member 153 also includes an elongate scale member 187 typically in the form of a round bar having a threaded end, positioned to extend between and through extension members 194, 195. A longitudinally oriented e.g., numbered scale 188 is connected to, positioned upon or integral with an outer surface of the elongate scale member 187. A pair of fixture nuts 191, 192, is provided to connect to the threaded end of the scale member 187 to thereby position the scale member 187 between the lateral extension members 194, 195. Telescopic member 153 further includes flange 198 configured to connect to stub 133 of arm 115, 115' and flange 199 configured to connect to a corresponding flange of the adjacent-most fixed-size member 161, 162.

According to the illustrated configuration, lateral extension members 174, 194 are fixedly connected to or through the stationary member 171 to provide a fixed reference. Similarly, lateral extension members 175, 195 are fixedly connected to or through the retractable member 173 to provide a movable reference. The fixture nuts 181, 182 set a fixed position for the end of the threaded positioning member 177 and the extension member positioning nuts 183, 184 immobilize the position of the retractable member 173 so that the lateral extension member 195 marks the position of the retractable member 173 in relation to scale 188 when the first and second end portions 31, 32, are connected to flanges 18, 20.

That is, according to the illustrated configuration, the extension member positioning nut 183 is threadingly connected to threaded positioning member 177 so that when tightened until engagement with the portion of the lateral extension member 175 facing the adjacent end portion 32, the extension member positioning nut 183 identifies or otherwise marks an amount of extension needed in conjunction with the fixed lengths of the fixed length member or members 161, 162 utilized to connect first and second end portions 31, 32 to the flanges 18, 20. Correspondingly, extension member 195 marks or otherwise identifies the relative position of the retractable member 173 in relation to scale 188. Additionally, according to the illustrated configuration, extension member positioning nut 184 can be tightened against extension member 175 in order to immobilize longitudinal movement of retractable member 173 during the retrieval process and to provide a counter force to extension member positioning nut 183 to prevent inadvertent movement.

Note, in the illustrated configuration, extension member positioning nut 184 is positioned on the side of the lateral extension member 175 opposite extension member positioning nut 183. In such configuration, in order to aid in a retrieval process, extension member positioning nut 184 can be temporary loosened so that upon removal of bolts 22, 23, connecting ends 31, 32, to flanges 18, 20, the retractable member 173 can readily collapse into the stationary member 171 to allow easy removal of the apparatus 30 without inadvertently changing any of the "settings." After removal from between flanges 18, 20, extension member positioning nut 184 can be re-tightened. Note also, although described in the form of fixture nuts 181, 182, an extension member positioning nuts 183, 184, and a threaded positioning member 177, it should be understood to one of ordinary skill in the art that alternative means for connecting positioning member 177 and marking the position of the retractable member 173 in relation to the stationary member 173 to provide a precise linear measurement used to manufacture replacement segment 29, are within the scope of the present invention. It should be further understood that first and second end portions 31, 32 can instead be connected to flanges 20, 18, respectively. Still further, it should be understood that telescopic member 153 can be connected adjacent arm 115' or even at a medial location rather than adjacent arm 115.

In operation, the adjustable template apparatus 30 shown, for example, in FIG. 2 is deployed with divers to a subsea location to provide measurements between a pair of flanges 18, connected to pipe ends 14, 16. As perhaps best shown in FIG. 4, according to an exemplary process, bolt holes 37' of backing plate 99 of the first end portion 31 are aligned with bolt holes 24 in flange 18. The bolts 22 are extended through the bolt holes 24, 37' and backing plate 99 to securely fastened to flange 18. Next, if not already previously accomplished, the approximate separation or travel between flange 18 and flange 20 is estimated and the linkage assembly 38 is assembled to include one or more fixed-size elongate members 161, 162 and an adjustable telescopic member 153. As perhaps best shown in FIG. 5, backing plate 35 is then positioned over the open face of flange 20, bolt holes 37 are aligned with bolt holes 25, bolts 23 are extended through bolt holes 37, 25, and backing plate 35 is securely fastened to flange 20.

Figure 6:
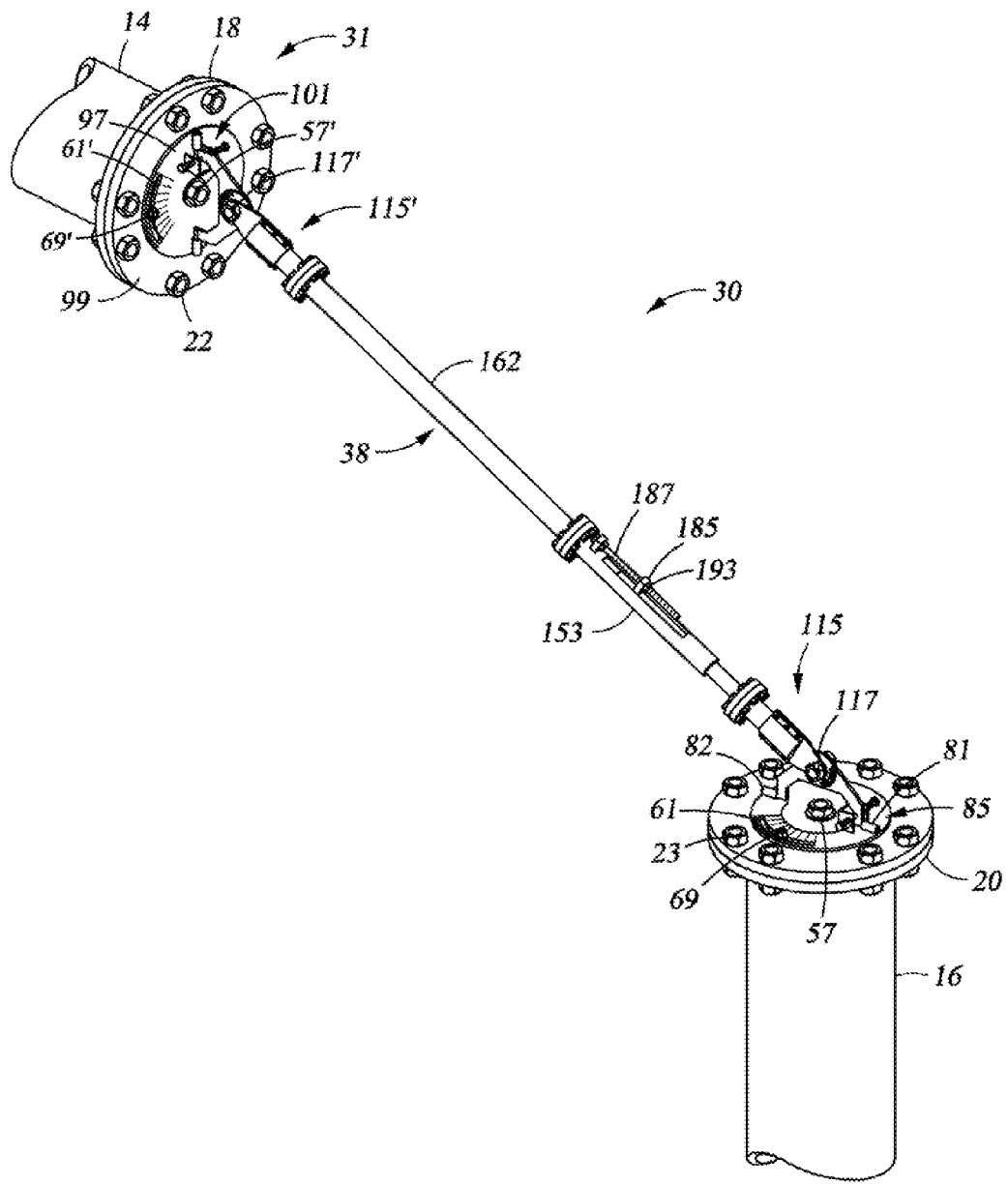
FIG. 6 is a perspective view of the adjustable template apparatus shown in FIG. 2 positioned between the pair of open ends of the piping circuit shown in FIG. 1 to provide measurements to model the dimension and contour of a segment of piping to replace the damaged segment also shown in FIG. 1 according to an embodiment of the present invention.

As perhaps best shown in FIG. 3D, nut 183, typically initially fully extended along the threads of threaded positioning member 177 is then tightened until landing upon lateral extension member 175, marking the amount of extension necessary to connect the first and the second ends 31, 32 of the apparatus 30 to the flanges 18, 20. According to the exemplary process, the position of nut 183 and/or the position of extension member 195 in relation to scale 188 in conjunction with a known length of the fixed-size elongate members 161, 162 defines at least a portion of the actual separation or travel between flanges 18, 20. FIG. 6 illustrates one example of how apparatus 30 may be connected to flanges 18, 20.

As perhaps best shown in FIG. 4, once connected, a diver typically tightens nut 57' to immobilize movement between backing plate 99 and alignment disk 97, and tightens nut 117' to immobilize movement between yoke 91 and arm 115'. Optionally, if provided in the form of a nut and bolt arrangement or other connection member, and the head of the nut or bolt is larger than aperture/slot 61' or otherwise encroaches upon the face of alignment disk 97, radially offset alignment member 69' can be tightened to further enhance immobilization of movement between backing plate 99 and alignment disk 97. Similarly, if provided in the form of a nut and bolt arrangement or other connection member, and the head of the nut or bolt is larger than aperture/slot 125' or otherwise encroaches upon the face of alignment flange 121', radially offset alignment member 129' can be tightened to further enhance immobilization of movement between yoke 91 and arm 115'.

Regardless of the implementation, the position of alignment member (e.g. nut) 69' provides an identification of an amount of relative rotation between backing plate 99 and alignment disk 97 with respect to a reference rotation, and the position of alignment flange (e.g., nut 129') provides an identification of an amount of relative rotation between yoke 91 and arm 115'. If scale 71' is included on the face of alignment disk 91, the amount of relative rotation between backing plate 99 and alignment disk 91 can be also read and documented. Similarly, if scale 131' is included on the face of alignment flange 121', the amount of relative rotation between yoke 91 and arm 115' can be also read and documented. According to the exemplary configuration, the angular difference between the central axis of the alignment plate 97 and/or the main axis of yoke 91 and the main axis of arm 115' define at least a portion of a vertical differential (or set) and/or horizontal differential (or run) between flanges 18, 20, depending upon its orientation.

Still referring to FIG. 4, the diver tightens alignment bolts 107, 109 of hinge fixation member 101 to immobilize relative rotational movement between yoke 91 and alignment disk 97. Typically, this includes tightening bolt 107 until the bolt engages the upper surface of a leg of yoke 91 and tightening bolt 109 until the bolt engages the lower surface of the leg of yoke 91. According to the exemplary configuration, the angular difference between the central axis of the alignment plate 97 and the main axis of yoke 91 define at least a portion of a vertical differential (or set) and/or horizontal differential (or run) between flanges 18, 20, depending upon its orientation.

As perhaps best shown in FIG. 5, once the second end portion 32 of the apparatus 30 is connected to flange 20, a diver typically tightens nut 57 to immobilize movement between backing plate 35 and alignment disk 51, and tightens nut 117 to immobilize movement between yoke 83 and arm 115. Optionally, if provided in the form of a bolt or other connection member, radially offset alignment member 69 can be tightened to further enhance immobilization of movement between backing plate 35 and alignment disk 51. Similarly, if provided in the form of a bolt or other connection member, radially offset alignment member 129 can be tightened to further enhance immobilization of movement between yoke 83 and arm 115.

Regardless of the implementation, the position of alignment member (e.g. nut) 69 provides an identification of an amount of relative rotation between backing plate 35 and alignment disk 51 with respect to a reference rotation, and a position of alignment flange (e.g. nut) 129 provides an identification of an amount of relative rotation between yoke 83 and arm 115. If scale 71 is included on the face of alignment disk 51, the amount of relative rotation between backing plate 35 and alignment disk 83 can be also read and documented. Similarly, if scale 131 is included on the face of alignment flange 121, the amount of relative rotation between yoke 83 and arm 115 can be also read and documented. According to the exemplary configuration, the angular difference between the central axis of the alignment plate 51 and/or the main axis of yoke 83 and the main axis of arm 115 define at least a portion of a vertical differential (or set) and/or horizontal differential (or run) between flanges 18, 20, depending upon its orientation.

Still referring to FIG. 5, the diver tightens alignment bolts 107, 109 of hinge fixation member 85 to immobilize relative rotational movement between yoke 83 and alignment disk 51. Typically, this includes tightening bolt 107 until the bolt engages the upper surface of a leg of yoke 83 and tightening bolt 109 until the bolt engages the lower surface of the leg of yoke 83. According to the exemplary configuration, the angular difference between the central axis of the alignment plate 51 and the main axis of yoke 83 define at least a portion of a vertical differential (or set) and/or horizontal differential (or run) between flanges 18, 20, depending upon its orientation.

Referring to FIG. 6, with apparatus 30 connected to flanges 18, 20, and all bolts tightened and readings taken, first and second end portions 31, 32 are disconnected from flanges 18, 20, respectively. For the configuration shown in FIG. 6, the step of disconnecting can include first disconnecting the second end portion 32. As noted previously, nut 184 can be loosened (if tightened) such that the inward face of lateral extension member 175 is sufficiently unobstructed to allow collapsing of the retractable member 173 of the telescopic member 153 within stationary member 171. In such configuration, once bolts 23 are removed from flange 20, the second end portion 32 can readily collapse inward, and thus, allow removal without inadvertently or deliberately changing any of the relative positions of the measurement components. Upon removal, nut 184 can then be tightened to help prevent inadvertent movement of member 173 and/or nut 183.

Finally, using the readings provided by apparatus 30, segment 29 is precisely manufactured to perfectly fit between flanges 18, 20. Advantageously, swivel flanges and/or flanges having elongate annular bolthole grooves are not required as the flange-pipe miter degree and bolthole positioning for flanges 201, 202 of segment 29, typically in the form of standard weld neck flanges, can be precisely determined using apparatus 30.

Figure 8:
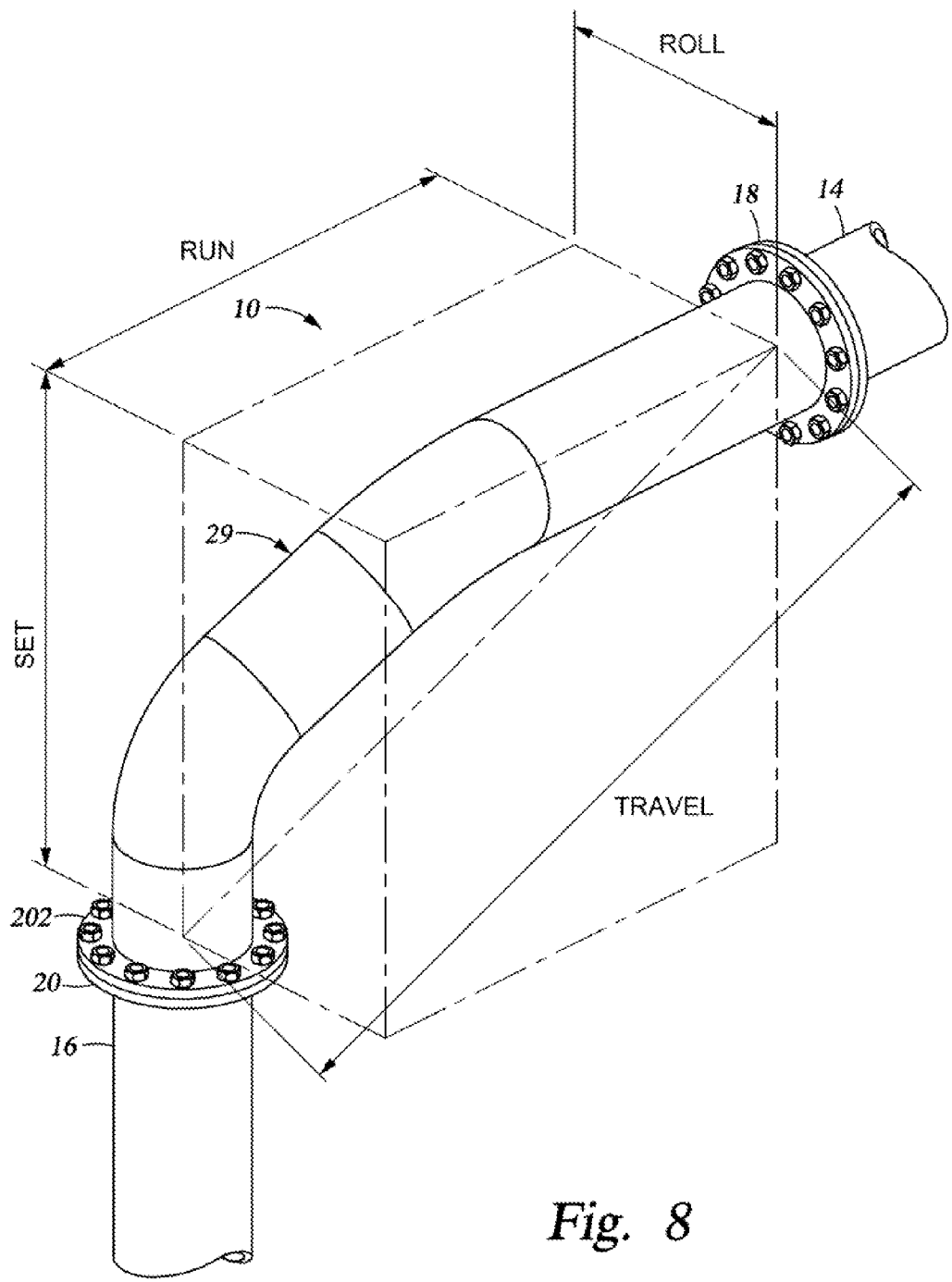
FIG. 8 is a perspective view of a section of subsea pipeline having a complicated subsea pipeline condition to illustrate capabilities of the adjustable template apparatus according to an embodiment of the present invention.
Figure 9:
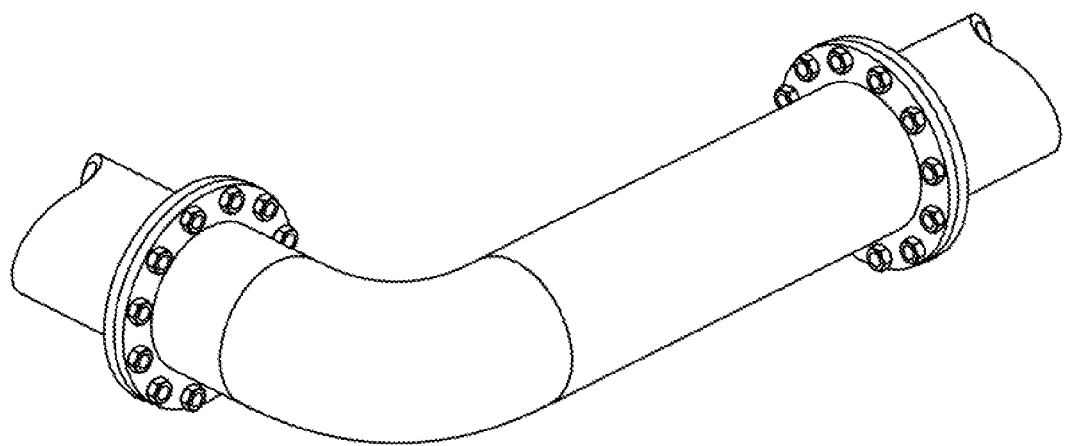
FIGS. 9-10 are perspective views of examples of dropout spools to illustrate dropout spool measurement capabilities of an adjustable template apparatus according to an embodiment of the present invention.
Figure 10:
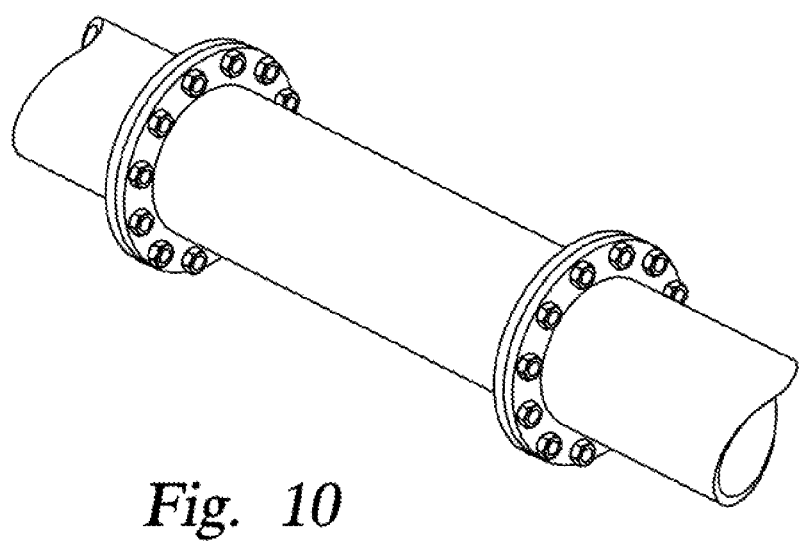

Various embodiments of the present invention have several advantages. For example, as perhaps best shown in FIG. 8, various embodiments of the present invention resolve the following criteria (1) measurement of the linear center to center distance between the existing subsea pipeline flange faces; (2) measurement of the rolling offset of subsea pipeline flanges centerline with respect to each other in X and Y planes (horizontal and vertical); (3) measurement of the degree of flange bolt holes orientation to avoid installation of expensive swivel flanges; (4) measurement of the pipe to flange miter degree; and (5) simplicity of use—the provision of a very precise measurement from the first attempt as offshore logistics are harsh and costly. Various embodiments of the present invention provide an apparatus with a very efficient securing mechanism to avoid slippage of the connecting parts for the linear distance. Advantageously, various embodiments of the present invention provide an apparatus in the form of a single jig assembly which provides the necessary measurements to easily fabricate both types of drop out spools shown in FIGS. 9 and 10, along with more complicated subsea pipeline sections having a complicated rolling offset such as, for example, that shown in FIG. 8. Advantageously, the same jig assembly can be used to fabricate a replacement section of subsea pipeline having significant roll, set, run, and/or travel and a replacement section subsea pipeline having minimal roll, set, run, and/or travel, and various combinations in between.

Various embodiments of the apparatus also or alternatively include fixed-length add-on sections to extend the telescopic length for lengthy subsea spools during subsea pipeline repair. As such, advantageously, various embodiments of the apparatus are suitable for use during construction of any size flow lines as well as for the repair of subsea trunk lines where very long pipe spools are required to be fabricated. Various embodiments of the apparatus also or alternatively include vertical and horizontal positioning plates with two spanner locknuts and position marking planes that guarantee rigidity of the template and marking reference, if required. Advantageously, fabricators will easily notice changes in the template initial position due to lifting once they see any loose locknuts or changed marks. Various embodiments of the apparatus also or alternatively include a backing plate with bolt hole centers that can meet the rotation of the existing flange hole centers, which allows the apparatus to employ standard weld neck flanges that are cheaper and more readily available in the market. Various embodiments of the apparatus also or alternatively include a design that is simpler than that conventionally available as it contains less moving parts and can be used by non-skilled divers.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification. For example, while the end portions 31, 32 apparatus 30 were described as primarily including like components, one of ordinary skill in the art would recognize that certain measurement determinations such as, for example, the relative rotation of the bolt holes of the flanges 18, 20 with respect to each other could be determined using a single coaxial alignment disk (positioning plate) 51, 97. Further, if sufficient immobilization can be provided by tightening nuts 57, 57', alignment member 69, 69' need not be tightened and/or can be replaced (or supplemented) with a scale indicator positioned on backing plate 35, 99. Additionally, it should be understood that scale 71, 71' can instead be positioned on backing plate 35, with a scale indicator or other alignment indication or member on the coaxial alignment disk 51, 97. Still further, similar configurational changes can be made with respect to alignment members 129, 129' and scales 131, 131' associated with arms 115, 115', respectively.

The invention claimed is:

1. A method to model the dimension and contour of a segment of piping to be installed between a pair of open ends of a piping circuit having a corresponding pair of connection flanges, the method comprising the steps of:
   connecting a first backing plate of an adjustable template apparatus over an open face of a first flange of a piping circuit of a pair of flanges configured to connect to a segment of piping to be installed therebetween, to include aligning bolt holes extending through the first backing plate with bolt holes extending through the first flange;
   connecting a second backing plate of the adjustable template apparatus over an open face of the second flange of the piping circuit, to include aligning bolt holes extending through the second backing plate with bolt holes extending through the second flange;
   identifying a rotational angular difference between the first backing plate and a first coaxial alignment disk coaxially located with the first backing plate and configured to rotate in relation thereto along a common central axis to thereby define at least a portion of an angular rotation between the pair of flanges of the piping circuit;
   identifying an angular difference between the common central axis and the main axis of a first hinged yoke connected to the first coaxial alignment disk by a pair of radially spaced apart hinges to define at least a portion of a vertical differential between the first flange of the piping circuit and a second flange of the pair of flanges of the piping circuit; and
   identifying an angular difference between the main axis of the first hinged yoke and a longitudinal axis of a linkage member of a linkage assembly connected to the first hinged yoke to define at least a portion of a lateral differential between the first flange of the piping circuit and the second flange of the piping circuit.

2. A method as defined in claim 1, wherein the step of identifying a rotational angular difference between the first backing plate and a first coaxial alignment disk, includes:
   determining a position of a radially offset alignment member extending axially from a face of the first backing plate and through a radially offset alignment aperture, the position determined in relation to a scale positioned on a face of the first coaxial alignment disk to indicate a relative rotation of the first alignment disk in relation to the radially offset alignment member.

3. A method as defined in claim 1, wherein the step of identifying a rotational angular difference between the first backing plate and a first coaxial alignment disk, includes:
   immobilizing rotation of the first coaxial alignment disk in relation to the first backing plate; and
   disconnecting the first backing plate from the first flange of the piping circuit.

4. A method as defined in claim 1, wherein the step of identifying an angular difference between the common central axis and the main axis of a first hinged yoke, includes:
   immobilizing rotation of the first hinged yoke about the pair of radially spaced apart hinges connected to the first coaxial alignment disk by employing a hinge fixation member also connected to the face of the coaxial alignment disk, the immobilization performed prior to disconnecting the first backing plate from the first flange of the piping circuit.

5. A method as defined in claim 4, wherein the hinge fixation member includes a pair of oppositely positioned coaxially aligned spaced apart bolt holes containing a corresponding pair of alignment bolts, and wherein the step of identifying an angular difference between the common central axis and the main axis of a first hinged yoke, further includes:
   tightening a first of the pair of alignment bolts to engage an upper surface of a leg of the first hinged yoke; and
   tightening a second of the pair of alignment bolts to engage a lower surface of the leg of the first hinged yoke to thereby immobilize rotation of the first hinged yoke.

6. A method as defined in claim 1, wherein the step of identifying an angular difference between the main axis of the first hinged yoke and a longitudinal axis of a linkage member, includes:
   determining a position of a radially offset alignment member extending axially from a face of an apex portion of the first hinged yoke and through a radially offset alignment aperture extending through a coaxial alignment flange, the position determined in relation to a scale positioned on a face of the coaxial alignment flange to indicate a relative rotation of the coaxial alignment flange in relation to the apex portion of the first hinged yoke about a common axis extending through an aperture extending through the coaxial alignment flange and coaxially located with an aperture extending through the apex portion of the first hinged yoke.

7. A method as defined in claim 6, wherein the step of identifying an angular difference between the main axis of the first hinged yoke and a longitudinal axis of a linkage member, includes:
   immobilizing rotation of the coaxial alignment flange in relation to the apex portion of the first hinged yoke prior to disconnecting the first backing plate from the first flange of the piping circuit.

8. A method as defined in claim 1,
   wherein the step of connecting the second backing plate to the second flange of the piping circuit includes the step of extending a length of the linkage member to connect between the first hinged yoke and an oppositely positioned second hinged yoke; and
   wherein the method further comprises the step of identifying the extended length of the linkage member to define at least a portion of a horizontal differential between the first flange of the piping circuit and the second flange of the piping circuit.

9. A method as defined in claim 8,
   wherein the linkage member includes a telescoping member adapted to be positioned between an extended position and a retracted position, the telescoping member comprising a stationary member and a retractable member positioned to retract within main body portions of the stationary member; and
   wherein the step of connecting a second backing plate of the adjustable template apparatus over an open face of the second flange of the piping circuit includes the steps of:
      connecting one or more of a plurality of fixed-size replaceable sections to extend a telescopic length of the linkage assembly to within a range of values provided by the telescoping member, and
      extending the retractable member to allow the second backing plate to land upon the second flange of the piping circuit.

10. A method as defined in claim 9, wherein the step of identifying the extended length of the linkage member includes the steps of:

tightening a first extension member positioning nut threadingly connected to a threaded positioning member, the threaded positioning member extending between a first lateral extension member fixedly connected to the stationary member and a second lateral extension member, the second lateral extension member fixedly connected to the retractable member and extending through a first elongate aperture in the stationary member;

the extension member positioning nut tightened until engagement with a first portion of the second lateral extension member facing the second end portion of the apparatus to thereby identify an amount of extension needed to connect the second backing plate to the second flange when the first backing plate is connected to the first flange;

determining a position of a third lateral extension member in relation to scale markings on an elongate scale member extending through the third lateral extension member, the third lateral extension member fixedly connected to the retractable member and extending through a second elongate aperture in the stationary member;

a second portion of the second lateral extension member located opposite the first portion of the second lateral extension member unobstructed to allow collapsing of the retractable member within the stationary member when disconnecting the first backing plate from the first flange of the piping circuit and when disconnecting the second backing plate from the second flange of the piping circuit; and tightening a second extension member positioning nut threadingly connected to the threaded positioning member to immobilize the retractable member.

11. A method as defined in claim 8, wherein the common central axis is a first common central axis, and wherein the method further comprises the steps of:

identifying a rotational angular difference between the second backing plate and a second coaxial alignment disk coaxially located with the second backing plate and configured to rotate in relation thereto along a second common central axis extending therebetween;

identifying an angular difference between the second common central axis and the main axis of a second hinged yoke connected to the second coaxial alignment disk by a pair of radially spaced apart hinges to define at least a portion of the vertical differential between the first flange of the piping circuit and the second flange of the piping circuit; and identifying an angular difference between the main axis of the second hinged yoke and the longitudinal axis of the linkage member of the linkage assembly connected to the second hinged yoke to define at least a portion of a lateral differential between the first flange of the piping circuit and the second flange of the piping circuit.

12. A method to model the dimension and contour of a segment of piping to be installed between a pair of open ends of a piping circuit having a corresponding pair of connection flanges, the method comprising the steps of:

connecting a first backing plate of an adjustable template apparatus over an open face of a first flange of a piping circuit of a pair of flanges configured to connect to a segment of piping to be installed therebetween, to include aligning bolt holes extending through the first backing plate with bolt holes extending through the first flange;

connecting a second backing plate of the adjustable template apparatus over an open face of a second flange of the piping circuit, to include aligning bolt holes extending through the second backing plate with bolt holes extending through the second flange;

identifying a rotational angular difference between the first backing plate and a first coaxial alignment disk coaxially located and landing upon a face of the first backing plate and configured to rotate in relation thereto along a first common central axis extending therebetween to thereby define at least a portion of an angular rotation between the pair of flanges of the piping circuit; and identifying a rotational angular difference between the second backing plate and a second coaxial alignment disk coaxially located and landing upon a face of the second backing plate and configured to rotate in relation thereto along a second common central axis extending therebetween to thereby further define the angular rotation between the pair of flanges of the piping circuit.

13. A method as defined in claim 12, further comprising the steps of:

identifying an angular difference between the first common central axis and the main axis of a first hinged yoke connected to the first coaxial alignment disk by a pair of radially spaced apart hinges to define at least a portion of a vertical differential between the first flange of the piping circuit and the second flange of the pair of flanges of the piping circuit; and identifying an angular difference between the second common central axis and the main axis of a second hinged yoke connected to the second coaxial alignment disk by a pair of radially spaced apart hinges to thereby further define the vertical differential between the first flange of the piping circuit and the second flange of the piping circuit.

14. A method as defined in claim 12, further comprising the steps of:

identifying an angular difference between the main axis of a first hinged yoke and a longitudinal axis of a linkage member of a linkage assembly connected to the first hinged yoke to define at least a portion of a lateral differential between the first flange of the piping circuit and the second flange of the piping circuit; and identifying an angular difference between the main axis of a second hinged yoke and the longitudinal axis of the linkage member of the linkage assembly connected to the second hinged yoke to thereby further define the lateral differential between the first flange of the piping circuit and the second flange of the piping circuit.

15. An adjustable template apparatus to model the dimension and contour of a segment of piping to be installed between a pair of open ends of a piping circuit having a corresponding pair of connection flanges, the apparatus comprising:

a first end portion configured to connect to a first flange of a first open end portion of a piping circuit, the first flange of the first open end portion of the piping circuit adapted to connect to a first open end portion of a pair of open end portions of a removed segment of piping, the first end portion of the apparatus including a first hinged yoke positioned to account for at least a portion of the vertical differential between the first and the second flanges of the piping circuit;

a second end portion configured to connect to a second flange of a second open end portion of the piping circuit, the second flange of the second open end portion of the piping circuit adapted to connect to a second open end portion of the pair of open end portions of the removed segment of piping, the second end portion of the apparatus comprising:
- a backing plate having a plurality of circumferentially spaced apart bolt holes positioned to align with a corresponding plurality of circumferentially spaced apart bolt holes extending through the second flange of the piping circuit to connect to the backing plate over an open face of the second flange, and having a centrally positioned bolt hole positioned at a center of the backing plate and extending therethrough,
- a coaxial alignment disk configured to land upon a face of the backing plate and to rotate in relation to the backing plate to indicate at least a portion of a rotational difference between the annular positioning of the bolt holes of the first flange of the first open end portion of the piping circuit and annular positioning of bolt holes of the second flange of the second open end portion of the piping circuit, the coaxial alignment disk having a centrally positioned bolt hole positioned at a center of the coaxial alignment disk and coaxially located with the centrally positioned bolt hole extending through the backing plate, and having a radially offset alignment aperture extending therethrough and positioned to receive a radially offset alignment member,
- a bolt extending through the bolt hole extending through the backing plate and the coaxially located bolt hole extending through the coaxial alignment disk,
- the radially offset alignment member extending axially from the face of the backing plate and through the radially offset alignment aperture to provide a reference indication of a relative rotation of the coaxial alignment disk in relation to the backing plate to thereby define at least a portion of an angular rotation between the first and the second flanges of the piping circuit;
- a scale positioned on a face of the coaxial alignment disk to indicate an angular value of the relative rotation of the coaxial alignment disk in relation to the backing plate,
- a pair of radially spaced apart hinges connected to the face of the coaxial alignment disk, and
- a second hinged yoke rotationally connected to the pair of radially spaced apart hinges to thereby account for at least one of the following: a portion of a vertical differential between the first and the second flanges of the piping circuit and an at least primarily vertical component of pipe-to-flange miter for the second flange of the second open end portion of the piping circuit; and
- a linkage assembly extending between a medial portion of the first hinged yoke and a medial portion of the second hinged yoke, linkage assembly including an elongate adjustable linkage member configured to provide an indication of at least a portion of a relative distance between the first and the second flanges of the piping circuit.

16. The apparatus as defined in claim 15, wherein the radially offset alignment member comprises a bolt positioned to immobilize rotation of the coaxial alignment disk in relation to the backing plate.

17. The apparatus as defined in claim 15, wherein the second end portion of the apparatus comprises a hinge fixation member connected to the face of the coaxial alignment disk, the hinge fixation member including a pair of oppositely positioned coaxially aligned spaced apart bolt holes containing a corresponding pair of alignment bolts, a first of the pair of alignment bolts positioned to engage an upper surface of a leg of the second hinged yoke, and a second of the pair of alignment bolts positioned to engage a lower surface of the leg of the second hinged yoke to thereby immobilize rotation of the second hinged yoke.

18. The apparatus as defined in claim 15, wherein the second hinged yoke includes an apex portion having a bolt hole extending therethrough, and wherein the linkage assembly further comprises an arm connected to the apex portion of the second hinged yoke, the arm including:
- a coaxial alignment flange having a bolt hole coaxially located with the bolt hole in the apex of the second hinged yoke and a radially offset alignment aperture extending therethrough; and
- a scale positioned on a face of the coaxial alignment flange to indicate a relative rotation of the coaxial alignment flange in relation to the apex portion of the second hinged yoke about a common axis extending through the bolt holes of the coaxial alignment flange and the second hinged yoke.

19. The apparatus as defined in claim 15,
wherein the elongate adjustable linkage member comprises a telescoping member adapted to be positioned between an extended position and a retracted position; and
wherein the linkage assembly further comprises a plurality of fixed-size replaceable sections positioned to extend a telescopic length of the linkage assembly to a distance short of the distance between the first and the second flanges of the piping circuit, a shortfall being within a range of telescopic positioning values provided by the telescoping member.

20. The apparatus as defined in claim 19, wherein the backing plate is a second backing plate, and wherein the telescoping member comprises:
- a stationary member having an elongate aperture extending through a side portion of the stationary member;
- a retractable member positioned to retract within main body portions of the stationary member;
- a first lateral extension member fixedly connected to the stationary member;
- a second lateral extension member fixedly connected to the retractable member and extending through the elongate aperture in the stationary member;
- a threaded positioning member extending between the first lateral extension member and the second lateral extension member; and
- an extension member positioning nut threadingly connected to the threaded positioning member, the extension member positioning nut positioned so that when tightened until engagement with a first portion of the second lateral extension member facing the second end portion of the apparatus when the first end portion of the apparatus is connected to the first flange of the piping circuit and the second end portion of the apparatus is connected to the second flange of the piping circuit, the extension member positioning nut identifies an amount of extension needed to connect the second end portion of the apparatus to the second flange with the first end portion of the apparatus connected to the first flange of the piping circuit.

21. An adjustable template apparatus to model the dimension and contour of a segment of piping to be installed between a pair of open ends of a piping circuit having a corresponding pair of connection flanges, the apparatus comprising:

a first end portion configured to connect to a first flange of a first open end portion of a piping circuit, the first flange of the first open end portion of the piping circuit adapted to connect to a first open end portion of a pair of open end portions of a removed segment of piping; and a second end portion configured to connect to a second flange of a second open end portion of the piping circuit, the second flange of the second open end portion of the piping circuit adapted to connect to a second open end portion of the pair of open end portions of the removed segment of piping, the second end portion of the apparatus comprising:

a backing plate having a plurality of circumferentially spaced apart bolt holes positioned to align with a corresponding plurality of circumferentially spaced apart bolt holes extending through the second flange of the piping circuit to connect to the backing plate over an open face of the second flange, and having a centrally positioned bolt hole positioned at a center of the backing plate and extending therethrough, a coaxial alignment disk configured to land upon a face of the backing plate and to rotate in relation to the backing plate to indicate at least a portion of a rotational difference between the annular positioning of the bolt holes of the first flange of the first open end portion of the piping circuit and annular positioning of bolt holes of the second flange of the second open end portion of the piping circuit, the coaxial alignment disk having a centrally positioned bolt hole positioned at a center of the coaxial alignment disk and coaxially located with the centrally positioned bolt hole extending through the backing plate, and having a radially offset alignment aperture extending therethrough and positioned to receive a radially offset alignment member, and a connection member extending through the bolt hole extending through the backing plate and the coaxially located bolt hole extending through the coaxial alignment disk, the radially offset alignment member extending axially from the face of the backing plate and into the radially offset alignment aperture; and a linkage assembly extending between the first and the second end portions of the apparatus, linkage assembly including an elongate adjustable linkage member configured to provide an indication of at least a portion of a relative distance between the first and the second flanges of the piping circuit.

22. The apparatus as defined in claim 21, further comprising:

a scale positioned on a face of the coaxial alignment disk to indicate a relative rotation of the coaxial alignment disk in relation to the radially offset alignment member to thereby define at least a portion of an angular rotation between the first and the second flanges of the piping circuit.

23. The apparatus as defined in claim 21, wherein the first end portion of the apparatus includes:
  a coaxial alignment disk,
  a first hinged yoke positioned to account for at least a portion of the vertical differential between the first and the second flanges of the piping circuit and an at least primarily vertical component of pipe-to-flange miter for the first flange of the first open end portion of the piping circuit, and
  a pair of radially spaced apart hinges connected to a face of the coaxial alignment disk of the first end portion of the apparatus; and wherein the second end portion of the apparatus further includes:

a second hinged yoke positioned to further account for at least a portion of the vertical differential between the first and the second flanges of the piping circuit and an at least primarily vertical component of pipe-to-flange miter for the second flange of the second open end portion of the piping circuit, and a pair of radially spaced apart hinges connected to a face of the coaxial alignment disk of the second end portion of the apparatus.

24. The apparatus as defined in claim 21, wherein at least one or more of the first and the second ends of the apparatus include a hinged yoke, the hinged yoke including an apex portion having a bolt hole extending therethrough; and wherein the linkage assembly further comprises an arm connected to the apex portion of the hinged yoke, the arm including a coaxial alignment flange having a bolt hole coaxially located with the bolt hole in the apex of the hinged yoke and a radially offset alignment aperture extending therethrough.

25. The apparatus as defined in claim 24, wherein the arm further includes:

a scale positioned on a face of the coaxial alignment flange of the arm to indicate a relative rotation of the coaxial alignment flange of the arm in relation to the apex portion of the hinged yoke about a common axis extending through the bolt holes of the coaxial alignment flange of the arm and the hinged yoke.

26. The apparatus as defined in claim 21, wherein the elongate adjustable linkage member comprises a telescoping member adapted to be positioned between an extended position and a retracted position; and wherein the linkage assembly further includes a plurality of fixed-size replaceable sections positioned to extend a telescopic length of the linkage assembly to within a range of values provided by the telescoping member.

* * * * *